United States Patent
Tran et al.

(10) Patent No.: US 11,402,243 B1
(45) Date of Patent: Aug. 2, 2022

(54) DISTRIBUTED PROCESS STATE AND INPUT ESTIMATION FOR HETEROGENEOUS ACTIVE/PASSIVE SENSOR NETWORKS

(71) Applicant: UNIVERSITY OF SOUTH FLORIDA, Tampa, FL (US)

(72) Inventors: Dzung Minh Duc Tran, Tampa, FL (US); Tansel Yucelen, Tampa, FL (US); Selahattin Burak Sarsilmaz, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 782 days.

(21) Appl. No.: 16/106,506

(22) Filed: Aug. 21, 2018

Related U.S. Application Data

(60) Provisional application No. 62/576,367, filed on Oct. 24, 2017.

(51) Int. Cl.
*G01D 21/02* (2006.01)
*G01D 18/00* (2006.01)

(52) U.S. Cl.
CPC ................... *G01D 18/004* (2013.01)

(58) Field of Classification Search
CPC ........ G01D 18/004; G01D 9/00; G01D 21/00; G01D 21/02; G05B 23/0254; G05B 23/0281; G05B 19/042; G06K 9/00536; G06N 20/00; G06N 3/0454; G06N 7/005; G05D 1/0088
USPC ........ 702/104, 150, 182, 184–185, 188–189; 714/26
See application file for complete search history.

(56) References Cited

U.S. PATENT DOCUMENTS 7,286,964 B2 * 10/2007 Kim .................. G01H 9/004
340/870.15
7,554,291 B2 * 6/2009 Yoshida ............ H02J 7/0013
320/116

(Continued)

FOREIGN PATENT DOCUMENTS

| CN | 102176222 A | 9/2011 |
| CN | 105471096 A | 4/2016 |

OTHER PUBLICATIONS

Akhenak et al., "State estimation of uncertain multiple model with unknown inputs," In IEEE Conference on Decision and Control, 2004.

(Continued)

*Primary Examiner* — Jeffrey P Aiello
(74) *Attorney, Agent, or Firm* — Quarles & Brady LLP

(57) ABSTRACT

Systems and methods are described for estimating a state of a process and an input to the process using a sensor network. Each sensor node in the sensor network is directly to one or more adjacent sensor nodes and indirectly coupled to the remaining sensor nodes through the one or more adjacent sensor nodes. Each sensor node iteratively calculates a new estimated state based on estimations of the state and the input to the process calculated by the sensor node in a previous iteration. The new estimated state is then adjusted based on a difference between a predicted and actual output of a sensor and is further adjusted based on differences between a previous estimated state calculated by the sensor node and estimated states calculated by adjacent sensor nodes.

20 Claims, 11 Drawing Sheets

(56) References Cited

U.S. PATENT DOCUMENTS

| | | | | |
|---|---|---|---|---|
| 8,175,821 | B2* | 5/2012 | Nagakubo | G01L 5/228 |
| | | | | 702/42 |
| 8,996,195 | B2 | 3/2015 | Yucelen et al. | |
| 9,058,028 | B2* | 6/2015 | Kim | G05B 13/0205 |
| 2003/0172156 | A1* | 9/2003 | Price | B60H 1/00871 |
| | | | | 709/225 |
| 2005/0075846 | A1* | 4/2005 | Kim | G01N 29/245 |
| | | | | 703/1 |
| 2010/0063777 | A1* | 3/2010 | Berkcan | G05B 19/042 |
| | | | | 702/188 |
| 2011/0087455 | A1* | 4/2011 | Chang | G06F 3/0446 |
| | | | | 702/150 |
| 2014/0114607 | A1* | 4/2014 | Chang | G06F 3/04182 |
| | | | | 702/150 |
| 2014/0180614 | A1* | 6/2014 | Chaturvedi | G01R 31/367 |
| | | | | 702/63 |
| 2014/0297845 | A1* | 10/2014 | Tamura | G06F 11/2094 |
| | | | | 709/224 |
| 2015/0066402 | A1* | 3/2015 | Feng | G01R 19/2513 |
| | | | | 702/60 |
| 2016/0109411 | A1* | 4/2016 | Pellegrino | G01N 29/44 |
| | | | | 702/39 |
| 2017/0293379 | A1* | 10/2017 | Lee | G06K 9/0002 |
| 2018/0074482 | A1* | 3/2018 | Cheng | G05B 23/0237 |

OTHER PUBLICATIONS

Bai et al., "Robust Dynamic Average Consensus of Time-varying Inputs," 49th IEEE Conference on Decision and Control, 2010, 3104-3109.

Bowong et al., "Unknown inputs' adaptive observer for a class of chaotic systems with uncertainties," Mathematical and Computer Modelling, 2008, 48(11): 1826-1839.

Casbeer et al., "Average bridge consensus: Dealing with active-passive sensors," In ASME Dynamic Systems and Control Conference, 2015.

Chen et al., "Distributed average tracking of multiple time-varying reference signals with bounded derivatives," IEEE Transactions on Automatic Control, 2012, 57(12): 3169-3174.

Chen et al., "Simultaneous identification of time-varying parameters and estimation of system states using iterative learning observers," International Journal of Systems Science, 2007, 38(1): 39-45.

Corless et al., "State and input estimation for a class of uncertain systems," Automatica, 1998, 34(6): 757-764.

Cunningham et al., "DDF-SAM 2.0: Consistent Distributed Smoothing and Mapping," IEEE International Conference on Robotics and Automation (ICRA), 2013, 5220-5227.

Demetriou, "Natural consensus filters for second order infinite dimensional systems," Systems & Control Letters, 2009, 58(12): 826-833.

Freeman et al., "Stability and convergence properties of dynamic average consensus estimators," In IEEE Conference on Decision and Control, 2006.

Hollinger et al., "Distributed Data Fusion for Multirobot Search," IEEE Transactions on Robotics, 2015, 31(1): 55-66.

Hu et al., "Consensus of multi-agent systems with Luenberger observers," Journal of the Franklin Institute, 2013, 350: 2769-2790.

Kim et al., "A parameter dependent Riccati equation approach to output feedback adaptive control," In AIAA Guid., Mav., and Contr. Conf., Portland, OR, 2011.

Kim, "K-modification and a novel approach to output feedback adaptive control," A Dissertation Presented to the Academic Faculty, Georgia Institute of Technology, 2011.

Makarenko et al., "Decentralized Data Fusion and Control in Active Sensor Networks," Proceedings of the Seventh International Conference on Information Fusion, 2004, vol. 1, 479-486.

Millán et al., "Sensor-network-based robust distributed control and estimation," Control Engineering Practice, 2013, 21 (9):1238-1249.

Mohamed et al., "Unknown inputs observer for a class of nonlinear uncertain systems: An LMI approach," International Journal of Automation and Computing, 2012, 9(3):331-336.

Mu et al., "Efficient distributed sensing using adaptive censoring-based inference," Automatica, 2014, 50(6):1590-1602.

Olfati Saber et al., "Consensus filters for sensor networks and distributed sensor fusion," In Proceedings of the 44th IEEE Conference on Decision and Control, 2005, pp. 6698-6703.

Olfati Saber, "Distributed Kalman filter with embedded consensus filters," In Proceedings of the 44th IEEE Conference on Decision and Control, 2005, pp. 8179-8184.

Olfati-Saber, "Distributed Kalman filtering for sensor networks," In IEEE Conference on Decision and Control, 2007, pp. 5492-5498.

Peterson et al., "An active-passive networked multiagent systems approach to environment surveillance," In AIAA Guidance, Navigation, and Control Conference, 2015.

Peterson et al., "Application of active-passive dynamic consensus filter approach to multitarget tracking problem for situational awareness in unknown environments," In AIAA Guidance, Navigation, and Control Conference, 2016, p. 1857.

Peterson et al., "Exploitation of heterogeneity in distributed sensing: An active-passive networked multiagent systems approach," In American Control Conference, 2015, pp. 4112-4117.

Peterson et al., "Generalizations on active-passive dynamic consensus filters," In American Control Conference, 2016, pp. 3740-3745.

Sadikhov et al., "Adaptive Estimation Using Multiagent Network Identifiers With Undirected and Directed Graph Topologies," Journal of Dynamic Systems, Measurement, and Control, 2014, vol. 136, 021018, 9 pages.

Spanos et al., "Dynamic consensus on mobile networks," In IFAC world congress (Citeseer), 2005, pp. 1-6.

Su et al., "Modeling of Nonlinear Aggregation for Information Fusion Systems with Outliers Based on the Choquet Integral," Sensors, 2011, 11(3): 2426-2446.

Su et al., "On Selection of Data Fusion Schemes for Structural Damage Evaluation," Structural Health Monitoring, 2009, 8(3): 223-241.

Taylor et al., "Dynamic input consensus using integrators," In 2011 American Control Conference, 2011, pp. 3357-3362.

Tran et al., "Distributed Input and State Estimation Using Local Information in Heterogeneous Sensor Networks," Frontiers in Robotics and AI, 2017.

Üstebay et al., "Efficient decentralized approximation via selective gossip," IEEE Journal of Selected Topics in Signal Processing, 2011, 5(4): 805-816.

Viegas et al., "Distributed state estimation for linear multi-agent systems with time-varying measurement topology," Automatica, 2015, 54, 72-79.

Volyanskyy et al., "A new neuroadaptive control architecture for nonlinear uncertain dynamical systems: Beyond σ-and e-modifications," IEEE Transactions on Neural Networks, 2009, 20(11):1707-1723.

Wang et al., "Improved GSO Optimized ESN Soft-Sensor Model of Flotation Process Based on Multisource Heterogeneous Information Fusion," The Scientific World Journal, 2014, Article ID 262368, 12 pages.

Yucelen et al., "Derivative-free output feedback adaptive control of an Aeroelastic Generic Transport Model," In AIAA Guid., Nav., and Contr. Conf., Portland, OR, 2011.

Yucelen et al., "Distributed control of active-passive networked multiagent systems," IEEE Transactions on Control of Network Systems, 2017, 4(4): 707-715.

Yucelen et al., "Low-frequency learning and fast adaptation in model reference adaptive control," IEEE Transactions on Automatic Control, 2013, 58(4): 1080-1085.

Yucelen, "Advances in adaptive control theory: Gradient-and derivative-free approaches," A Dissertation Presented to the Academic Faculty of the School of Aerospace Engineering, Georgia Institute of Technology, 2011.

Yucelen, "On networks with active and passive agents," arXiv:1405.1480, 2014.

(56) References Cited

OTHER PUBLICATIONS

Zavlanos et al., "Graph Theoretic Connectivity Control of Mobile Robot Networks," Proceedings of the IEEE 99, 2011, 1525-1540.

* cited by examiner

DISTRIBUTED PROCESS STATE AND INPUT ESTIMATION FOR HETEROGENEOUS ACTIVE/PASSIVE SENSOR NETWORKS

CROSS-REFERENCE TO RELATED APPLICATIONS

This application claims the benefit of U.S. Provisional Patent Application No. 62/576,367, filed Oct. 24, 2017, and entitled "DISTRIBUTED INPUT AND STATE ESTIMATION FOR SENSOR NETWORKS," the entire contents of which is incorporated herein by reference.

STATEMENT REGARDING FEDERALLY SPONSORED RESEARCH OR DEVELOPMENT

This invention was made with government support under FA9550-17-1-0303 awarded by the Air Force. The government has certain rights in the invention.

BACKGROUND

The present invention relates to sensing technology and, in particular, relates to sensor networks.

SUMMARY

A distributed input and state estimation architecture is introduced and analyzed for heterogeneous sensor networks. Specifically, nodes of a sensor network are allowed to have heterogeneous information roles. In addition, these nodes are allowed to have nonidentical sensor modalities. A feature of the framework described herein is that it utilizes local information not only during the execution of the proposed distributed input and state estimation architecture, but also in its design in that global stability is guaranteed once each node satisfies given local stability conditions independent from the graph topology and neighboring information of these nodes. Several illustrative numerical examples are further provided to demonstrate the efficacy of the proposed architecture. For example, a subset of nodes can be active (i.e., subject to observations of a process of interest) and the rest can be passive (i.e., subject to no observations of the process of interest). Both fixed and time-varying active and passive roles of sensor nodes in the network are investigated under the common underlying assumption that they have complementary properties distributed over the sensor network to achieve observability.

In one embodiment, the invention provides a method for estimating an observed process using a sensor network that includes a plurality of active sensor nodes and a plurality of passive sensor nodes. An electronic processor receives an output signal from a sensor of a first sensor node indicative of a measurement of an observed process. The electronic processor calculates a new estimated state of the observed process based at least in part on a previous estimation of the state calculated for the first sensor node and a previous estimation of an input to the observed process calculated for the first sensor node. In some implementations, the previous estimation of the state and the input were calculated by the electronic processor in a previous iteration. The electronic processor then adjusts the new estimated state based on an observed difference between a predicted output of the sensor of the first sensor node and an actual output of the sensor of the first sensor node and further adjusts the new estimated state based on a calculated difference between the previous estimation of the state calculated for the first sensor node and an estimation of the state calculated for a second sensor node that is adjacent to the first sensor node in the sensor network. The adjusted new estimated state of the observed process is then output to at least one adjacent sensor node in the sensor network.

In another embodiment, the invention provides a sensor network that includes a plurality of sensor nodes arranged in an undirected and connected graph topology. Each sensor node is communicatively coupled directly to one or more adjacent sensor nodes and is indirectly coupled to the remaining sensor nodes through the one or more adjacent sensor nodes. The sensor network includes a subset of active sensors that are able to observe a process of interest and a subset of passive sensor nodes that are not able to observe the process of interest. Each sensor node includes a sensor and an electronic processor configured to iteratively repeat a process for estimating a state of the process of interest. The electronic processor of each sensor node receives an output signal from its corresponding sensor indicative of a measurement of the observed process. A new estimated state is calculated based at least in part on estimations of the state of the process and an input to the process calculated by the sensor node in a previous iteration. The new estimated state is then adjusted based on a difference between a predicted output of the sensor and an actual output of the sensor and is further adjusted based on calculated differences between the estimation of the state calculated for the sensor node in the previous iteration and an estimation of the state calculated for each adjacent sensor node. The adjusted new estimated state of the observed process is then output to each adjacent sensor node.

In some embodiments, the invention provides a heterogeneous sensor network including a first subset of sensors, a second subset of sensors, and an electronic processor. The first subset of sensors includes active sensors while the second subset of sensors includes passive sensors. The electronic processor is configured to estimate an input for a sensor in one selected from a group consisting of the first subset of sensors and the second subset of sensors using only local information, and estimate a state for the sensor using only local information by satisfying a local stability condition.

Other aspects of the invention will become apparent by consideration of the detailed description and accompanying drawings.

DETAILED DESCRIPTION

Figure 1:
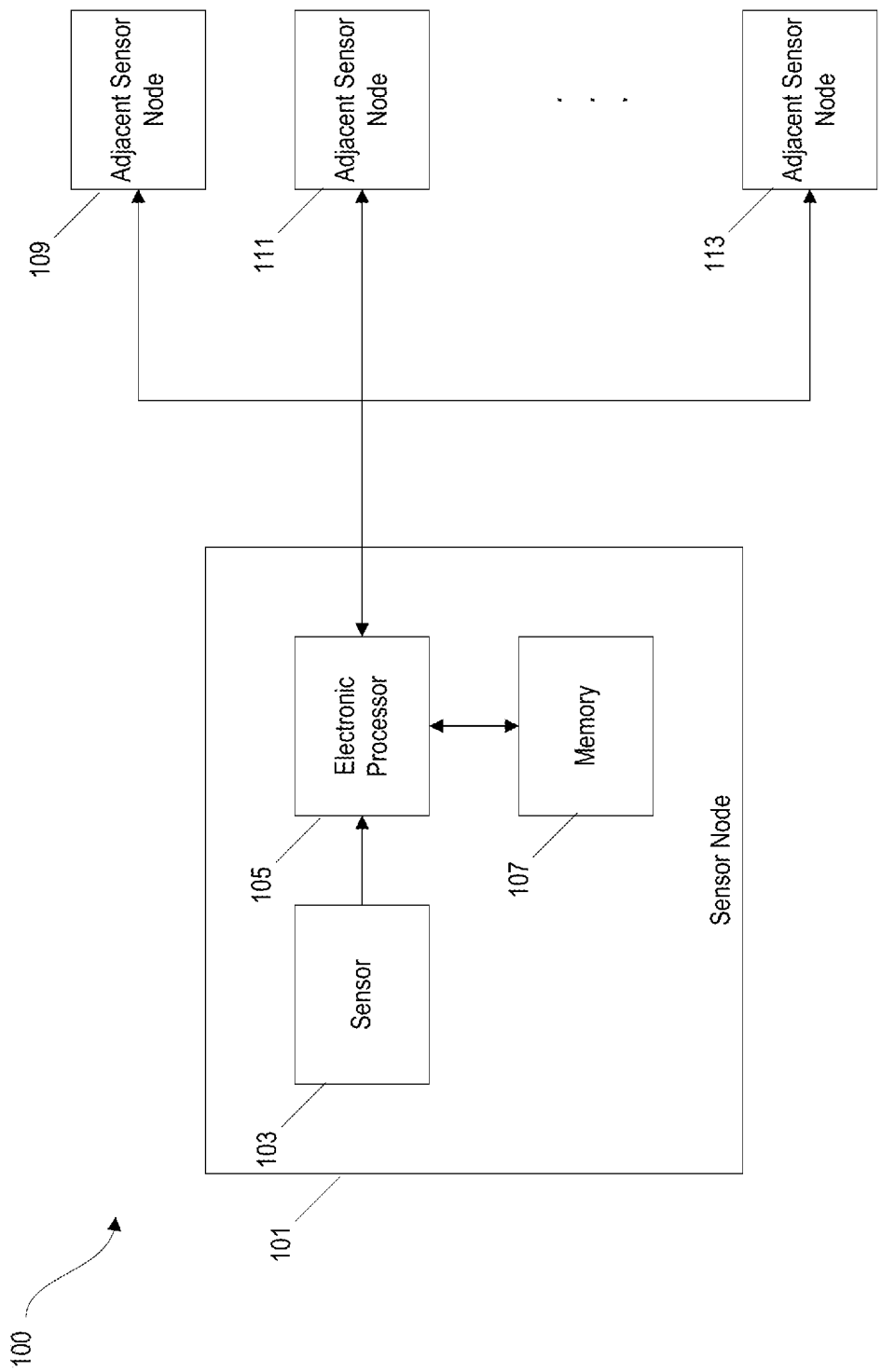
FIG. 1 is a block diagram of a sensor node in a sensor network according to one embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

As technological advances have boosted the development of integrated microsystems that combine sensing, computing, and communication on a single platform, we are rapidly moving toward a future in which large numbers of integrated microsensors have the capability to operate in both civilian and military environments. Such large-scale sensor networks will support applications with dramatically increasing levels of complexity including situational awareness, environment monitoring, scientific data gathering, collaborative information processing, and search and rescue; to name but a few examples. One of the important areas of research in sensor networks is the development of distributed estimation algorithms for dynamic information fusion. Systems and algorithms, such as those described in the examples below, can continue to operate reliably even when subsets of nodes in the sensor network and/or communication links between some of the nodes are lost. These systems are flexible in the sense that nodes can be added and removed by making only local changes to the sensor network.

Heterogeneity in sensor networks is unavoidable in real-world applications. To elucidate this fact, consider the example of a system configured to estimate the position and/or speed of a moving target. Nodes of a sensor network configured to monitor the moving target can have heterogeneous information roles such that some nodes are subject to observations of the target object (i.e., active nodes) while the rest are not (i.e., passive nodes). Furthermore, in some implementations, the nodes of a sensor network can also have different sensor modalities. For example, some nodes in the sensor network can be configured to sense/measure the position of the target object while other nodes in the network are configured to sense/measure the velocity of the target object.

Dealing with these classes of heterogeneity in sensor networks to achieve correct and reliable dynamic information fusion is a challenging task using distributed estimation algorithms. In some implementations, dynamic consensus algorithms might be implemented in sensor networks where all nodes are active nodes. However, in many cases, a subset of nodes in a given sensor network can be passive in that they may not be able to sense and collect information about a process of interest (e.g., a position or velocity of a target object). Similar problems arise for sensor networks in which individual sensor nodes are configured to sense/measure in different modalities (e.g., position vs. velocity).

The examples presented below provide a new distributed input and state estimation architecture for heterogeneous sensor networks. Specifically, the systems and methods described herein can be applied to a sensor network with a first subset of nodes that are active nodes and a second subset of nodes that are passive nodes. In different implementations, the role of each individual nodes as an active node or a passive node can be fixed or varying. Furthermore, the systems and methods described below can be adapted and applied to sensor networks that include nodes with non-identical sensor modalities under the common underlying assumption that they have complimentary properties distributed over the sensor network to achieve collective observability. The systems and method described below utilize local information, not only during the execution of the proposed distributed input and state estimation, but also in its design. Accordingly, global stability is guaranteed once each node satisfies given local stability conditions independent from the graph topology and neighboring information of the nodes in the sensor network.

FIG. 1 illustrates an example of a sensor node 101 in a sensor network 100. The sensor node 101 includes a sensor 103 configured to sensor/measure a condition of an observable process. For example, in an implementation where the sensor network 100 is configured to observe movement of an object in space, the sensor 103 may be configured to measure a position and/or a velocity of the target object. The sensor node 101 also includes an electronic processor 105 and a non-transitory, computer-readable memory 107. The memory 107 stores data and computer-executable instructions that are executed by the electronic processor 105 to provide the functionality of the sensor node 101 including, for example, the functionality described in the examples below. The electronic processor 105 receives an output signal from the sensor 103 indicative of a measured condition of the target process (e.g., indicative of movement and/or position of the object in space). The electronic processor 105 executes instructions accessed from the memory 107 in order to determine an estimate of a state of the observed process and an estimate of an "input" to the observed process (e.g., a command controlling movement of the target object). The electronic processor 105 is also communicatively coupled to a plurality of other sensor nodes in the sensor network while other sensor nodes in the sensor network are not directly coupled to the sensor node 101. Accordingly, sensor nodes that are in direct communication with the sensor node 101 are referred to herein as "adjacent nodes" (e.g., adjacent nodes 109, 111, and 113 in the example of FIG. 1).

Figure 2:
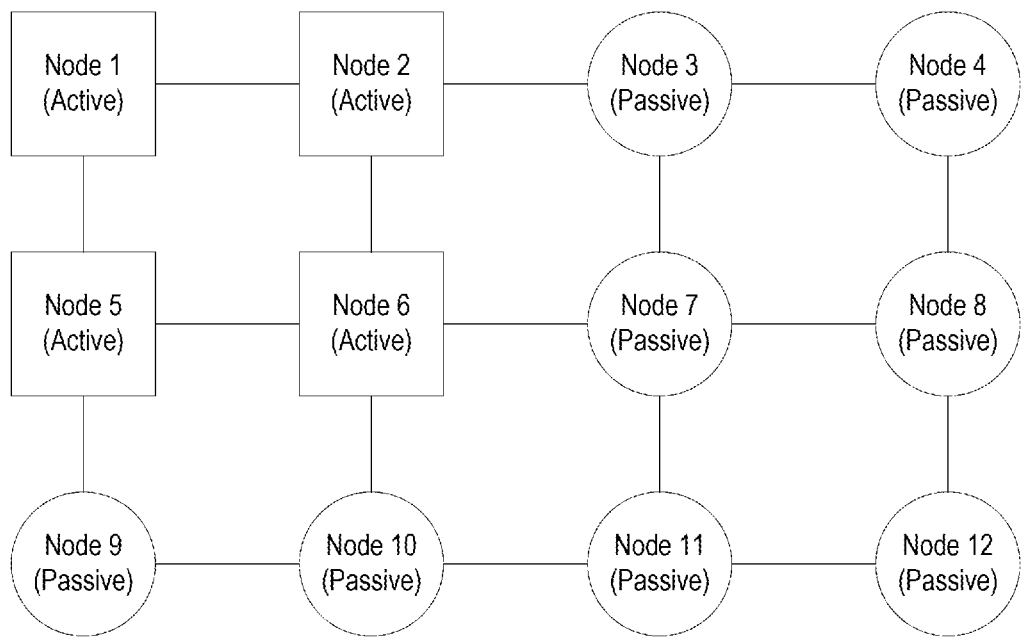
FIG. 2 is a block diagram of a first example of a sensor network including four active sensor nodes and eight passive sensor nodes.

FIG. 2 illustrates an example of a sensor network 200 including twelve sensor nodes (such as, for example, the sensor node 101 of FIG. 1). In the sensor network 200 of FIG. 2, four nodes are active nodes (i.e., Node 1, Node 2, Node 5, and Node 6) while the remaining eight sensor nodes are passive nodes. In the network topology of the example of FIG. 2, Node 1 is in direct communication with Node 2, Node 5, and Node 6. Accordingly, Nodes 2, 5, & 6 are "adjacent" to Node 1. Similarly, Node 7 is coupled in direct communication with (i.e., "adjacent to") Nodes 3, 6, 8, and 11.

Figure 3:
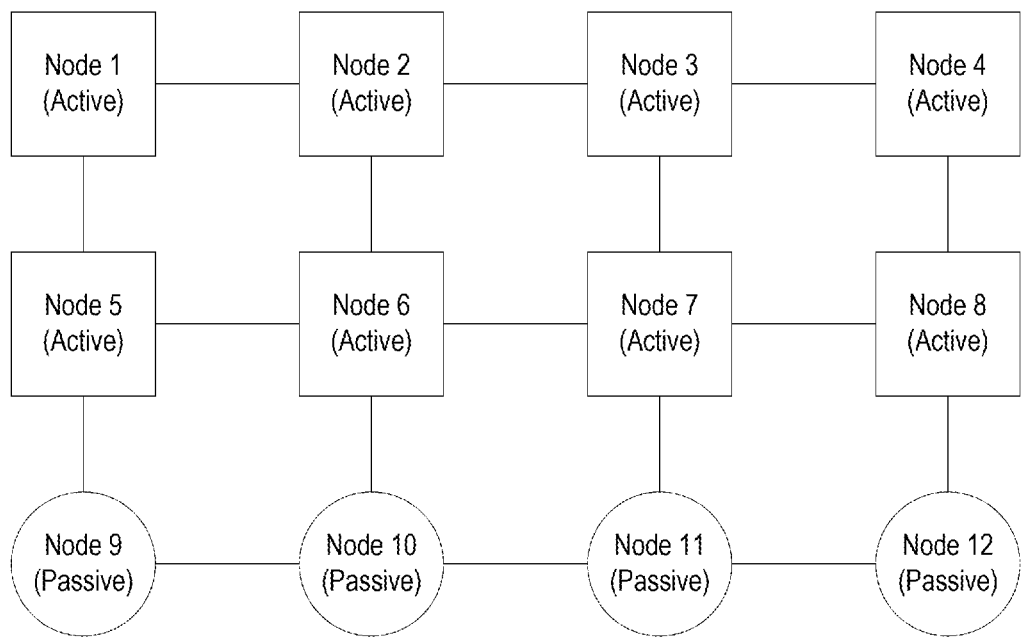
FIG. 3 is a block diagram of a second example of a sensor network including eight active sensor nodes and four passive sensor nodes.

FIG. 3 illustrates another example of a sensor network 300 including twelve sensor nodes. However, unlike the example of FIG. 2, in the example of FIG. 3 eight sensor nodes are active nodes while only four nodes are passive nodes. As discussed in further detail below, a sensor node can be fixedly "passive" by design such that, for example, the node does not include a sensor that is capable of observing/measuring a particular process or the sensing capabilities of the node have been actively disabled. Alternatively, in some implementations, some or all of the sensor nodes in the sensor network can be varyingly active or passive. For example, a sensor node can become an "active node" when an object under observation moves within range of the sensor node and can become a "passive node" when the object moves beyond range of the sensor node.

In some implementations, each node in the sensor network (or a select subset of nodes) is individually configured to determine an estimated state of a process under observation as well as an estimated "input" to the process under observation based on the output of the local sensor (i.e., sensor 103 of sensor node 101), previously stored information, and information received from adjacent sensor nodes. In at least some implementations, the process enables each individual node to determine the estimated state and input without requiring sensor information from all of the sensor nodes in the sensor network.

Figure 4A:
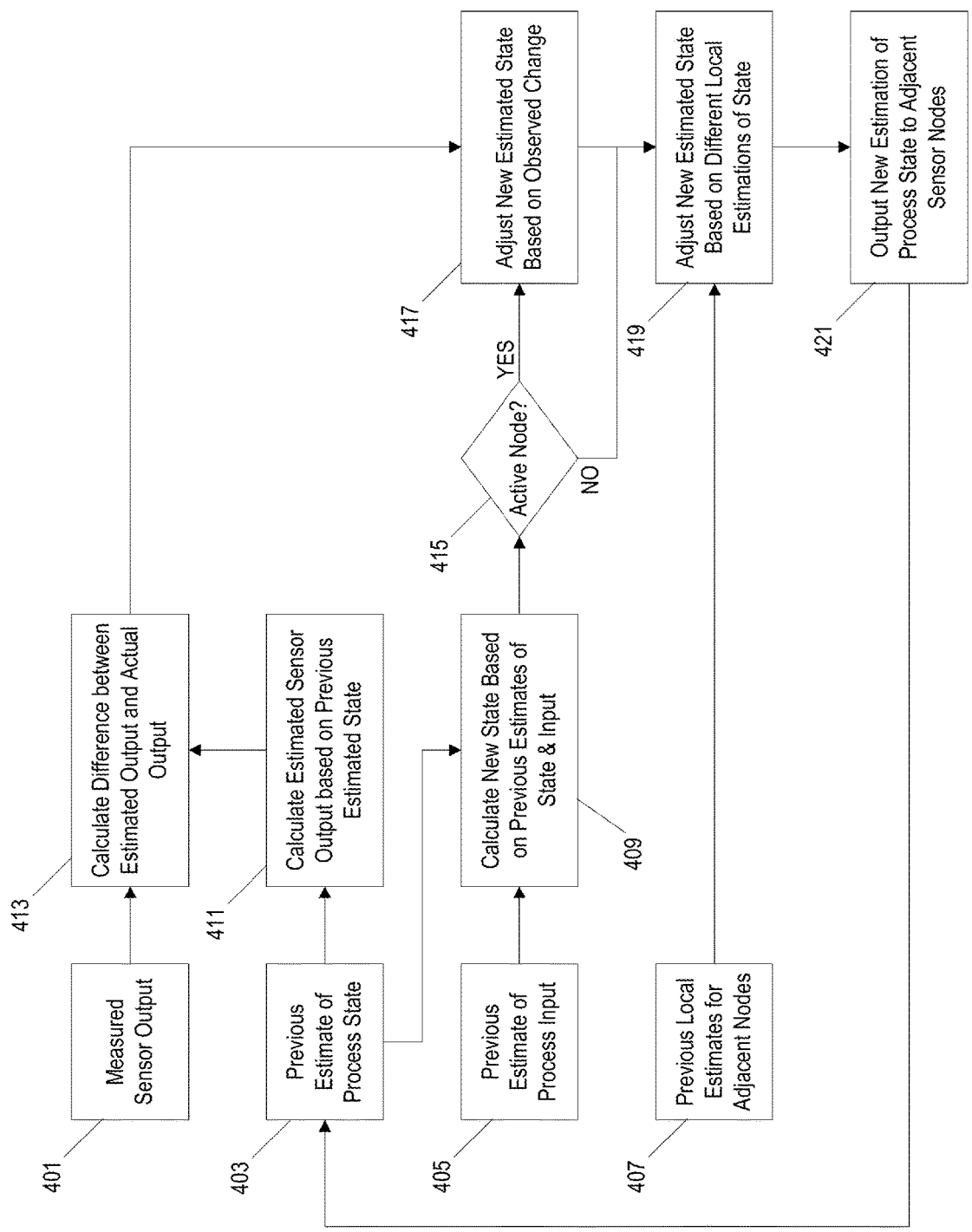
FIG. 4A is a flowchart of a method for estimating a state of a process observed by one or more sensor nodes in a sensor network using the sensor node of FIG. 1.

FIG. 4A illustrates an example of a method executed by a sensor node (such as sensor node 101 of FIG. 1) for determining an estimated state of the process under observation. First, the electronic processor 105 receives a signal from the sensor 103 indicative of a measured output of the sensor (step 401), accesses a previously calculated estimation of the state and input (e.g., stored to memory 107) (steps 403 and 405), and receives a previous local estimate of the state and the input as determined by the adjacent nodes in the sensor network (step 407). As described in further detail below, the electronic processor 105 calculates an initial new estimated state based on the estimated state and the estimate input calculated by the electronic processor 105 in a previous iteration (i.e., the values accessed from the memory 107) (step 409).

If the sensor node 101 is an "active node" (step 415), then the electronic processor 105 adjusts the initial estimated state based on observed differences between an expected output of the sensor 103 and an actual output of the sensor 103 (step 417). In particular, as described in further detail below, the electronic processor calculates an estimated sensor output based at least in part on the estimated state from the previous iteration (step 411). In other words, the electronic processor 105 determines what the output of the sensor 103 would be if the state and input of the process were unchanged since the last iteration. The electronic processor 105 then calculates a difference between the estimated sensor output and the actual output of the sensor 103 (step 413) and adjusts the new estimated state based at least in part on the difference (step 415). However, if the sensor node 101 is not an "active node," then the sensor 103 will not produce an output indicative of the observed process and, therefore, the new estimated state cannot be adjusted based on a difference between the expected sensor output and the actual sensor output (i.e., step 415 is skipped if the sensor node is a passive node).

Next, the new estimated state is adjusted by the electronic processor 105 based on differences between previous local estimations of the state of the observed process (step 419). For example, as described in further detail below, the electronic processor 105 may be configured in some implementations to calculate a difference between the estimated state calculated by the sensor node in the previous iteration and the estimated state calculated by each adjacent node.

After the new estimated state is calculated (step 409) and adjusted for observed differences in the sensor output (step 417) and/or differences in local estimations of the state (step 419), the new estimation of the process state is transmitted to adjacent nodes in the sensor network (step 421) and saved to the memory 107 to be used in the next iteration of the state estimation (i.e., step 403).

Figure 4B:
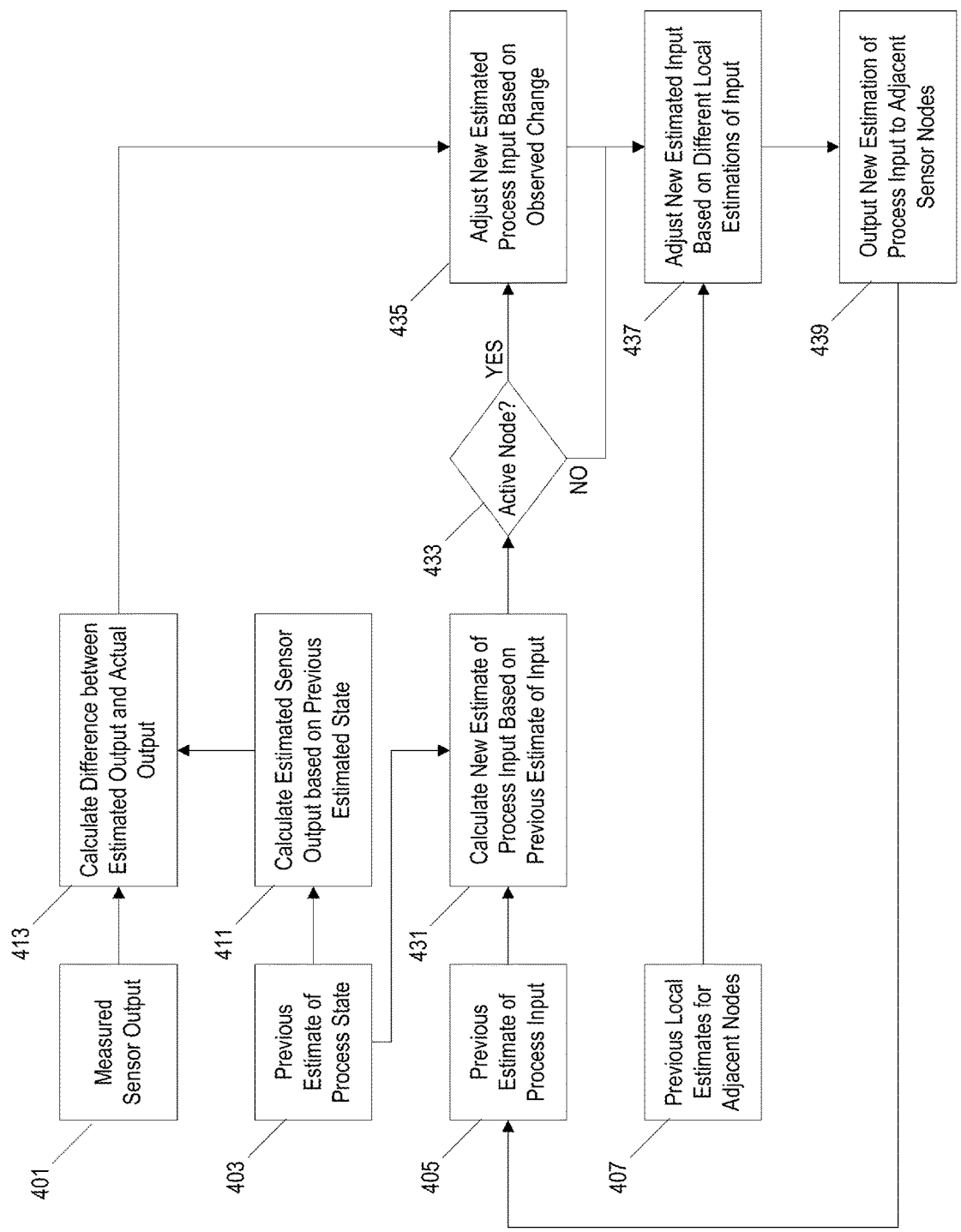
FIG. 4B is a flowchart of a method for estimating an input to the process observed by the one or more sensor nodes in the sensor network using the sensor node of FIG. 1.

In the example of FIG. 4A, one of the inputs used to calculate a new current state of the observed process is a previously calculated estimate of a process input (step 405). FIG. 4B illustrates an example of a method implemented by the sensor node 101 for estimating the process input state. Again, as discussed above in reference to the example of FIG. 4A, the electronic processor 105 receives a measured output from the sensor 103 (step 401), accesses from the memory 107 estimated values of the state and input for the observed process from a previous iteration (step 403 and 405), and receives estimated values of the state and input from other adjacent nodes (step 407). The electronic processor 105 calculates a new estimate of the process input based at least in part on the previous estimate of the input accessed from memory (step 431). In some implementations, the electronic processor 105 is configured to calculate an updated "input" estimate for the process based at least in part on design coefficients for the particular sensor node (as discussed in further detail below). In some implementations, the electronic processor is configured to simply assume initially that the input has not changed since the previous iteration and, accordingly, the initial new estimate of the input is determined to be equal to the estimated input from the previous iteration.

Similar to the example of FIG. 4A, if the sensor node 101 is an "active node" (step 433), then the electronic processor 105 adjusts the initial estimated input based on the observed differences between an expected output of the sensor 103 and an actual output of the sensor 103 (step 435). More specifically, and as discussed in further detail below, the electronic processor 105 is configured to calculate an estimated sensor output based on the estimated state from the previous iteration (step 411) and to calculate a difference between the estimated sensor output and the actual sensor output (step 413). The electronic processor 105 is also configured to adjust the new estimated process input based on differences between the process input estimated by the sensor node 101 in the previous iteration and the process input as estimated by the adjacent nodes in direct communication with the sensor node 101 (step 437).

After the new estimated process input is calculated (step 431) and adjusted for observed differences in the sensor output (step 435) and/or differences in local estimations of the process input (step 437), the new estimation of the process input is transmitted to adjacent nodes in the sensor network (step 439) and saved to the memory 107 to be used in the next iteration of the process input estimation (i.e., step 405).

A series of specific numerical examples are provided below to further illustrate the details of certain implementations of the methods and systems described above. In the examples below, $\mathbb{R}$ denotes the set of real numbers, $\mathbb{R}^n$ denotes the set of n×1 real column vectors, $\mathbb{R}^{n \times m}$ denotes the set of n×m real matrices, $\mathbb{S}_+^{n \times n}$ (resp., $\overline{\mathbb{S}}_+^{n \times n}$) denotes the set of n×n positive-definite (resp., positive-semidefinite) real matrices, $0_n$ denotes the n×1 vector of all zeros, $1_n$ denotes the n×1 vector of all ones, and $I_n$ denotes the n×n identity matrix. In addition, we write $(\cdot)^T$ for transpose, $(\cdot)^\dagger$ for generalized inverse, $\lambda_{min}(A)$ and $\lambda_{max}(A)$ for the minimum and maximum eigenvalue of the Hermitian matrix A, respectively, $\lambda_i(A)$ for the i-th eigenvalue of A, where A is Hermitian and the eigenvalues are ordered from least to greatest value, diag(a) for the diagonal matrix with the vector a on its diagonal, $[x]_i$ for the entry of the vector x on the i-th row, and $[A]_{ij}$ for the entry of the matrix A on the i-th row and j-th column.

Graphs are broadly adopted in the description of sensor networks to encode interactions between nodes. An undirected graph $\mathcal{G}$ is defined by a set $V_{\mathcal{G}} = \{1, \ldots, N\}$ of nodes and a set $\mathcal{E}_{\mathcal{G}} \subset V_{\mathcal{G}} \times V_{\mathcal{G}}$ of edges. If $(i, j) \in \mathcal{E}_{\mathcal{G}}$, then the nodes i and j are neighbors (i.e., adjacent nodes) and the neighboring relation is indicated with i~j. The degree of a node is given by the number of its neighbors. Letting $d_i$ be the degree of node i, then the degree matrix of a graph $\mathcal{G}$, $\mathcal{D}(\mathcal{G}) \in \mathbb{R}^{N \times N}$, is given by $$\mathcal{D}(\mathcal{G}) \triangleq \text{diag}(d), d = [d_1, \ldots, d_N]^T \qquad (1)$$

A path $i_0 i_1 \ldots i_L$ is a finite sequence of nodes such that $i_{k-1} \sim i_k$, $k=1, \ldots, L$, and a graph $\mathcal{G}$ is connected if there is a path between any pair of distinct nodes. The adjacency matrix of a graph $\mathcal{G}$, $\mathcal{A}(\mathcal{G}) \in \mathbb{R}^{N \times N}$, is given by $$[\mathcal{A}(\mathcal{G})]_{ij} \triangleq \begin{cases} 1, & \text{if } (i,j) \in \mathcal{E}_{\mathcal{G}} \\ 0, & \text{otherwise.} \end{cases} \qquad (2)$$

The Laplacian matrix of a graph $\mathcal{L}(\mathcal{G}) \in \overline{\mathbb{S}}_+^{N \times N}$, playing a central role in many graph-theoretic treatments of sensor networks, is given by $$\mathcal{L}(\mathcal{G}) \triangleq \mathcal{G}(\mathcal{G}) - \mathcal{A}(\mathcal{G}). \qquad (3)$$

The spectrum of the Laplacian of an undirected and connected graph can be ordered as $$0 = \lambda_1(\mathcal{L}(\mathcal{G})) < \lambda_2(\mathcal{L}(\mathcal{G})) \leq \ldots \leq \lambda_N(\mathcal{L}(\mathcal{G})), \qquad (4)$$

with $1_N$ as the eigenvector corresponding to the zero eigenvalue $\lambda_1(\mathcal{L}(\mathcal{G}))$ and $\mathcal{L}(\mathcal{G}) 1_N = 0_N$ and $e^{\mathcal{L}(\mathcal{G})} 1_N = 1_N$. Throughout this description we assume that the graph $\mathcal{G}$ of a given sensor network is undirected and connected.

To develop some of the results of this system, the following lemmas are used:

Lemma 1 (see, e.g., Dennis S. Bernstein, *Matrix Mathematics: Theory, Facts, and Formulas*, Princeton University Press, 2009, Proposition 8.1.2): Let $A \in \mathbb{R}^{n \times n}$ and $B \in \mathbb{R}^{n \times n}$. If $A \geq 0$ and $B > 0$ then $A + B > 0$.

Lemma 2 (see, e.g., Dennis S. Bernstein, *Matrix Mathematics: Theory, Facts, and Formulas*, Princeton University Press, 2009, Proposition 8.2.4): Let $A \in \mathbb{R}^{n \times n}$, $B \in \mathbb{R}^{n \times m}$, $C \in \mathbb{R}^{m \times m}$, and $$X = \begin{bmatrix} A & B \\ B^T & C \end{bmatrix}.$$

Then, $X \geq 0$ if and only if one or both of the conditions given by $$A \geq 0, C - B^T A^\dagger B \geq 0, (I - AA^\dagger) B = 0, \qquad (5)$$

$$C \geq 0, A - BC^\dagger B^T \geq 0, (I - CC^\dagger) B^T = 0, \qquad (6)$$

hold.

Finally, Co$\Omega$ is defined as a polytope or a bounded polyheron, which is the intersection of a finite number of halfspace and hyperplanes. For the following lemma, let $P \in \mathbb{R}^{n \times n} A(t) \in \mathbb{R}^{n \times n}$, $Co\Omega \triangleq Co\{A_1, \ldots, A_L\}$ where Co denotes the convex hull and $A_i \in \mathbb{R}^{n \times n}$ are the vertices of the polytope.

Lemma 3 (see, e.g., Stephen P Boyd, Laurent El Ghaoui, Eric Fenton, and Venkataramanan Balakrishnan, *Linear Matrix Inequalities in System and Control Theory*, volume 15, SIAM 1994): If $P > 0$, $A_i^T P + P A_i \leq 0$ holds, then $P > 0$, $A^T(t) P + P A(t) \leq 0$ holds.

By letting $P = I_n$, it follows from Lemma 3 that $A^T(t) + A(t) \leq 0$ holds, when $A_i^T + A_i \leq 0$ holds. If, in addition, $A(t)$ is symmetric, then it further follows that $A(t) \leq 0$ holds, if $A_i \leq 0$.

The examples discussed below relate to a process of interest with open-loop or closed-loop dynamics given by $$\dot{x}(t) = Ax(t) + Bw(t), x(0) = x0 \qquad (7)$$

where $x(t) \in \mathbb{R}^n$ denotes an unmeasurable process state vector, $w(t) \in \mathbb{R}^p$ denotes an unknown bounded input (e.g., command) to the process x with a bounded time rate of change, $A \in \mathbb{R}^{n \times n}$ denotes the Hurwitz system matrix necessary for internal process stability, and $B \in \mathbb{R}^{n \times p}$ denotes the system input matrix.

Next, consider a sensor network with N nodes exchanging information among each other using their local measurements according to an undirected and connected graph $\mathcal{G}$. If a node i, $i = 1, \ldots, N$, is subject to observations of the process (7) given by $$y_i(t) = C_i x(t), \qquad (8)$$

where $y_i(t) \in \mathbb{R}^m$ and $C_i \in \mathbb{R}^{m \times n}$ denote the measurable process output and the system output matrix for node i, $i = 1, \ldots, N$, respectively, then we say that it is an active node. Similarly, if a node i, $i = 1, \ldots, N$, has no observations, then we say that it is a passive node. Notice that the above formulation allows for nonidentical sensor modalities since $C_i$ of active nodes can be different. In the examples described below, each active node has complimentary properties distributed over the sensor network to guarantee collective observability, although the pairs $(A, C_i)$, $i = 1, \ldots, N$ may not be locally observable.

Here, we are interested in the problem of distributive estimating the unmeasureable state x(t) and the unknown input w(t) of the process given by (7) using a sensor network, where active nodes are subject to the observations given by (8). For node i, $i = 1, \ldots, N$, consider the distributed estimation algorithm (i.e., the methods of FIGS. 4A and 4B) given by $$\dot{\hat{x}}_i(t) = (A - \gamma P_i^{-1})\hat{x}_i(t) + B\hat{w}_i(t) + \quad (9)$$
$$g_i L_i(y_i(t) - C_i\hat{x}_i(t)) - \alpha P_i^{-1} \sum_{i \sim j} (\hat{x}_i(t) - \hat{x}_j(t)), \hat{x}_i(0) = \hat{x}_{i0}$$

$$\dot{\hat{w}}_i(t) = g_i J_i(y_i(t) - C_i\hat{x}_i(t)) - (\sigma_i K_i + \gamma I_p)\hat{w}_i(t) - \alpha \sum_{i \sim j} (\hat{w}_i(t) - \hat{w}_j(t)), \quad (10)$$
$$\hat{w}_i(0) = \hat{w}_{i0}$$

where $\hat{x}_i(t) \in \mathbb{R}^n$ is a local state estimate of $x(t)$ for node $i$, $\hat{w}_i \in \mathbb{R}^p$ is a local input estimate of $w(t)$ for node $i$, $L_i \in \mathbb{R}^{n \times m}$ and $J_i \in \mathbb{R}^{p \times m}$ are design matrices of node $i$ with $K_i$ being symmetric and positive definite, and $\alpha$, $\gamma$, and $\sigma_i \in \mathbb{R}$ are positive design coefficients for node $i$. Here, $g_i=1$ for active nodes and otherwise $g_i=0$. In addition, $P_i>0$ is the consensus gain satisfying the linear matrix inequality given by $$R_i = \begin{bmatrix} \overline{A}_i^T P_i + P_i \overline{A}_i & -P_i B + g_i C_i^T J_i^T \\ -B^T P_i + g_i J_i C_i & -2\sigma_i K_i \end{bmatrix} \leq 0, \quad (11)$$

where $$\overline{A}_i \triangleq A - g_i L_i C_i. \quad (12)$$

The local condition given by (11) for node $i$, $i=1, \ldots, N$, plays a central role in the stability analysis described below. Specifically, if the proposed input and state estimation architecture given by (9) and (10) satisfies the local condition given by (11) for each node, then the global stability is guaranteed for the overall sensor network. In addition, note that the local condition given by (11) is well-posed. To see this, for example, let $P_i$ satisfy the linear matrix inequality given by $\overline{A}_i^T P_i + P_i \overline{A}_i < 0$, $i=1, \ldots, N$. Then, it can be readily shown that there can exist a sufficiently large $\sigma_i$, $i=1, \ldots, N$, such that (11) holds. As a special case, if all nodes are active and a condition $P_i B = C_i^T J_i^T$ holds, then it can be easily seen that (11) holds even for small values of $\alpha_i$, $i=1, \ldots, N$. From this standpoint, it should be also mentioned that (11) relaxes this condition $P_i B = C_i^T J_i^T$. Finally, once again, for the special case when all nodes are active, if $\mathcal{H}(s) \triangleq J_i C_i (sI - \overline{A}_i)^{-1} B + \sigma_i K_i$ is passive, $i=1, \ldots, N$, then (11) is feasible and vice versa.

To illustrate this stability analysis in further detail, let $$\tilde{x}_i(t) \triangleq x(t) - \hat{x}_i(t) \text{ and } \tilde{w}_i(t) \triangleq \hat{w}_i(t) - w(t). \text{ Then,} \quad (13)$$
based on (9) and (10),
$$\dot{\tilde{x}}_i(t) = Ax(t) + Bw(t) - (A - \gamma P_i^{-1})\hat{x}_i(t) - B\hat{w}_i(t) -$$
$$g_i L_i(y_i(t) - C_i\hat{x}_i(t)) + \alpha P_i^{-1} \sum_{i \sim j} (\hat{x}_i(t) - \hat{x}_j(t)) =$$
$$(A - g_i L_i C_i)\tilde{x}_i(t) - B\tilde{w}_i(t) + \alpha P_i^{-1} \sum_{i \sim j} (\tilde{x}_i(t) - \tilde{x}_j(t)) + \gamma P_i^{-1}\hat{x}_i(t) =$$
$$\overline{A}_i \tilde{x}_i(t) - B\tilde{w}_i(t) - \alpha P_i^{-1} \sum_{i \sim j} (\tilde{x}_i(t) - \tilde{x}_j(t)) -$$
$$\gamma P_i^{-1}(\tilde{x}_i(t) - x(t)), \tilde{x}_i(0) = \tilde{x}_{i0}$$

$$\dot{\tilde{w}}_i(t) = g_i J_i C_i \tilde{x}_i(t) - \sigma_i J_i(\tilde{w}_i(t) + w(t)) - \quad (14)$$
$$\alpha \sum_{i \sim j} (\tilde{w}_i(t) - \tilde{w}_j(t)) - \gamma(\tilde{w}_i(t) + w(t)) - \dot{w}(t), \tilde{w}_i(0) = \tilde{w}_{i0}$$

Now, considering the aggregated vectors given by $$\tilde{x}(t) \triangleq [\tilde{x}_1(t), \tilde{x}_2(t), \ldots, \tilde{x}_N(t)] \in \mathbb{R}^{Nn}, \quad (15)$$

$$\tilde{w}(t) \triangleq [\tilde{w}_1(t), \tilde{w}_2(t), \ldots, \tilde{w}_N(t)] \in \mathbb{R}^{Np}, \quad (16)$$

We can write the error dynamics as $$\dot{\tilde{x}}(t) = \begin{bmatrix} \overline{A}_1 & 0 & \cdots & 0 \\ 0 & \overline{A}_2 & \cdots & 0 \\ \vdots & \vdots & \ddots & \vdots \\ 0 & 0 & \cdots & \overline{A}_N \end{bmatrix} \tilde{x}(t) - \begin{bmatrix} B & 0 & \cdots & 0 \\ 0 & B & \cdots & 0 \\ \vdots & \vdots & \ddots & \vdots \\ 0 & 0 & \cdots & B \end{bmatrix} \tilde{w}(t) - \quad (17)$$

$$\alpha \begin{bmatrix} L_{11} P_1^{-1} & L_{12} P_1^{-1} & \cdots & L_{1N} P_1^{-1} \\ L_{21} P_2^{-1} & L_{22} P_2^{-1} & \cdots & L_{2N} P_2^{-1} \\ \vdots & \vdots & \ddots & \vdots \\ L_{N1} P_N^{-1} & L_{N2} P_N^{-1} & \cdots & L_{NN} P_N^{-1} \end{bmatrix} \tilde{x}(t) -$$

$$\gamma \begin{bmatrix} P_1^{-1} & 0 & \cdots & 0 \\ 0 & P_2^{-1} & \cdots & 0 \\ \vdots & \vdots & \ddots & \vdots \\ 0 & 0 & \cdots & P_N^{-1} \end{bmatrix} \tilde{x}(t) + \gamma \begin{bmatrix} P_1^{-1} \\ P_2^{-1} \\ \vdots \\ P_N^{-1} \end{bmatrix} x(t)$$

$$\dot{\tilde{w}}(t) = \begin{bmatrix} g_1 J_1 C_1 & 0 & \cdots & 0 \\ 0 & g_2 J_2 C_2 & \cdots & 0 \\ \vdots & \vdots & \ddots & \vdots \\ 0 & 0 & \cdots & g_N J_N C_N \end{bmatrix} \tilde{x}(t) - \quad (18)$$

$$\begin{bmatrix} \sigma_1 K_1 & 0 & \cdots & 0 \\ 0 & \sigma_2 K_2 & \cdots & 0 \\ \vdots & \vdots & \ddots & \vdots \\ 0 & 0 & \cdots & \sigma_N K_N \end{bmatrix} \tilde{w}(t) - \begin{bmatrix} \sigma_1 K_1 \\ \sigma_2 K_2 \\ \vdots \\ \sigma_N K_N \end{bmatrix} w(t) -$$

$$\alpha \begin{bmatrix} L_{11} I_p & L_{12} I_p & \cdots & L_{1N} I_p \\ L_{21} I_p & L_{22} I_p & \cdots & L_{2N} I_p \\ \vdots & \vdots & \ddots & \vdots \\ L_{N1} I_p & L_{N2} I_p & \cdots & L_{NN} I_p \end{bmatrix} \tilde{w}(t) -$$

$$\gamma \begin{bmatrix} I_p & 0 & \cdots & 0 \\ 0 & I_p & \cdots & 0 \\ \vdots & \vdots & \ddots & \vdots \\ 0 & 0 & \cdots & I_p \end{bmatrix} \tilde{w}(t) + \begin{bmatrix} -\gamma w(t) - \dot{w}(t) \\ -\gamma w(t) - \dot{w}(t) \\ \vdots \\ -\gamma w(t) - \dot{w}(t) \end{bmatrix},$$

where $\mathcal{L}_{ij} \in \mathbb{R}$ is the entry in the i-th and j-th column of the Laplacian matrix The error dynamics now can be written a compact form as $$\dot{\tilde{x}}(t) = \overline{A}\tilde{x}(t) - (I_N \otimes B)\tilde{w}(t) - P^{-1}(F \otimes I_n)\tilde{x}(t) + \gamma P^{-1}(1_N \otimes I_n)x(t), \quad (19)$$

$$\dot{\tilde{w}}(t) = M\tilde{x}(t) - \tilde{K}(\tilde{w}(t) + (1_N \otimes I_p)w(t)) - (F \otimes I_p)\tilde{w}(t) - \gamma(1_N \otimes I_p)w(t) - (1_N \otimes I_p)\dot{w}(t), \quad (20)$$

where $$\overline{A} \triangleq \text{diag}([\overline{A}_1, \overline{A}_2, \ldots, \overline{A}_N]), \quad (21)$$

$$M \triangleq \text{diag}([g_1 J_1 C_1, g_2 J_2 C_2, \ldots, g_N J_N C_N]), \quad (22)$$

$$\overline{K} \triangleq \text{diag}([\sigma_1 K_1, \sigma_2 K_2, \ldots, \sigma_N K_N]), \quad (23)$$

$$F \triangleq \alpha \mathcal{L}(\mathcal{G}) + \gamma I_N, \quad (24)$$

$$P \triangleq \text{diag}([P_1, P_2, \ldots, P_N]), \quad (25)$$

with $\mathcal{L}(\mathcal{G})$ being the Laplacian matrix. Note that $P>0$ readily follows from $P_i>0$.

Consider the process given by (7) and the distributed input and the state estimation architecture given by (9) and (10). Assume (11) holds and nodes exchange information using local measurements subject to an undirected and connected graph $\mathcal{G}$. Then, the error dynamics given by (19) and (20) are uniformly bounded.

To demonstrate this, consider the Lyapunov function candidate given by $$V(\tilde{x},\tilde{w}) = \tilde{x}^T P \tilde{x} + \tilde{w}^T \tilde{w}. \tag{26}$$

Note that $V(0,0)=0$ and $V(\tilde{x},\tilde{w})>0$ for all $(\tilde{x},\tilde{w}) \neq (0,0)$. Taking time-derivative of $V(\tilde{x},\tilde{w})$ along the trajectories of (19) and (20) yields $$\dot{V}(\cdot) = \tag{27}$$
$$\tilde{x}^T(t)(\overline{A}^T P + P\overline{A})\tilde{x}(t) - 2\tilde{x}^T(t)P(I_N \otimes B)\tilde{w}(t) - 2\tilde{x}^T(t)(F \otimes I_n)\tilde{x}(t) +$$
$$2\gamma\tilde{x}^T(t)(1_N \otimes I_n)x(t) + 2\tilde{w}^T(t)M\tilde{x}(t) - 2\tilde{w}^T\overline{K}\tilde{w}(t) -$$
$$2\tilde{w}^T(t)F(\otimes I_p)\tilde{w}(t) - 2\tilde{w}^T(t)(\overline{K} + \gamma I_{Np})(1_N \otimes I_p)w(t) -$$
$$2\tilde{w}^T(t)(1_N \otimes I_p)\dot{w}(t) = [\tilde{x}^T(t) \quad \tilde{w}^T(t)]$$
$$\begin{bmatrix} \overline{A}^T P + P\overline{A} & -P(I_N \otimes B) + M^T \\ (-I_N \otimes B^T)P + M & -2\overline{K} \end{bmatrix}$$
$$\begin{bmatrix} \tilde{x}(t) \\ \tilde{w}(t) \end{bmatrix} + 2[\tilde{x}^T(t) \quad \tilde{w}^T(t)]$$
$$\begin{bmatrix} \gamma(1_N \otimes I_n)x(t) \\ -(\overline{K} + \gamma I_{Np})(1_N \otimes I_p)w(t)(1_N \otimes I_p)\dot{w}(t) \end{bmatrix} =$$
$$z^T R_A z(t) + z^T(t) R_B z(t) + 2z^T \phi = z^T R z(t) + 2z^T(t)\phi$$

$$z(t) \triangleq [\tilde{x}^T(t), \tilde{w}^T(t)]^T, \tag{28}$$

$$R_A \triangleq \begin{bmatrix} \overline{A}^T P + P\overline{A} & -P(I_N \otimes B) + M^T \\ (-I_N \otimes B^T)P + M & -2\overline{K} \end{bmatrix}, \tag{29}$$

$$R_B \triangleq \begin{bmatrix} -2(F \otimes I_n) & 0 \\ 0 & -2(F \otimes I_p) \end{bmatrix}, \tag{30}$$

$$R \triangleq R_A + R_B = \begin{bmatrix} \overline{A}^T P + P\overline{A} - 2(F \otimes I_n) & -P(I_N \otimes B) + M^T \\ (-I_n \otimes B^T)P + M & -2\overline{K} - 2(F \otimes I_p) \end{bmatrix}, \tag{31}$$

$$\phi \triangleq \begin{bmatrix} \gamma(1_N \otimes I_n)x(t) \\ -(\overline{K} + \gamma I_{Np})(1_N \otimes I_p)w(t) - (1_N \otimes I_p)\dot{w}(t) \end{bmatrix}, \tag{32}$$

Note that $(F \otimes I_n)>0$ and $(F \otimes I_p)>0$ readily follow from $F>0$, and hence $R_B<0$.

Next, since the linear matrix inequality given by (11) holds, it follows that $$\overline{A}_i^T P_i + P_i \overline{A}_i \leq 0, \tag{33}$$

$$N_i \triangleq -2\sigma_i K_i - (-B^T P_i + g_i J_i C_i)(\overline{A}_i^T P_i + P_i \overline{A}_i)^\dagger (-P_i B + g_i C_i^T J_i^T) \leq 0, \tag{34}$$

$$Q_i \triangleq (I_n - (\overline{A}_i^T P_i + P_i \overline{A}_i)(\overline{A}_i^T P_i + P_i \overline{A}_i)^\dagger)(-P_i B + g_i C_i^T J_i^T) = 0, \tag{35}$$

by applying Lemma 2 to (11). Note that $$\overline{A}^T P + P\overline{A} = \begin{bmatrix} \hat{A}_1 & 0 & \cdots & 0 \\ 0 & \hat{A}_2 & \cdots & 0 \\ \vdots & \vdots & \ddots & \vdots \\ 0 & 0 & \cdots & \hat{A}_N \end{bmatrix} \leq 0, \tag{36}$$

as a consequence of (33), where $\hat{A}_i \triangleq \overline{A}_i^T P_i + P_i \overline{A}_i$ for $i=1,\ldots,N$. Furthermore, it follows from (34) that $$N \triangleq -2K - (-(I_N \otimes B^T)P + M)(\overline{A}^T P + P\overline{A})^\dagger(-P(I_N \otimes B) + M^T) = \tag{37}$$
$$\begin{bmatrix} N_1 & 0 & \cdots & 0 \\ 0 & N_2 & \cdots & 0 \\ \vdots & \vdots & \ddots & \vdots \\ 0 & 0 & \cdots & N_N \end{bmatrix} \leq 0,$$

holds. Finally, (35) leads to $$Q \triangleq (I_{Nn} - (\overline{A}^T P + P\overline{A})(\overline{A}^T P + P\overline{A})^\dagger) \tag{38}$$

$$(-P(I_N \otimes B) + M^T) = \begin{bmatrix} Q_1 & 0 & \cdots & 0 \\ 0 & Q_2 & \cdots & 0 \\ \vdots & \vdots & \ddots & \vdots \\ 0 & 0 & \cdots & Q_N \end{bmatrix} = 0.$$

Now, by Lemma 2, $R_A \leq 0$ as direct consequence of (36), (37) and (38). Thus by Lemma 1, $R = R_A + R_B < 0$.

Note that since A is Hurwitz, and $\|w(t)\|_2 \leq \overline{w}$, we have $\|x(t)\|_2 \leq \overline{x}$. With this and $\|\dot{w}(t)\|_2 \leq \overline{\dot{w}}$, we have $\|\phi\|_2 \leq \overline{\phi}$ with $$\overline{\phi} \triangleq \sqrt{\gamma^2 \|1_N \otimes I_n\|_2^2 \overline{x}^2 + \|\overline{K} + \gamma I_{Np}\|_2^2 \|1_N \otimes I_p\|_2^2 \overline{w}^2 + \|1_N \otimes I_p\|_2^2 \overline{\dot{w}}^2} = \tag{39}$$
$$\sqrt{N\gamma^2 \overline{x}^2 + \|\overline{K} + \gamma I_{Np}\|_2^2 \overline{w}^2 + N\overline{\dot{w}}^2}$$

Now, one can write $$\dot{V}(\cdot) = z^T(t)Rz(t) + 2z^T(t)\phi \leq \lambda_{max}(R)\|z(t)\|_2^2 \|z(t)\|_2$$
$$\overline{\phi} \leq (1-\theta)\lambda_{max}(R)\|z(t)\|_2^2 + \theta\lambda_{max}(R)\|z(t)\|_2^2 + 2\|z(t)\|_2\overline{\phi}, \tag{40}$$

with $\lambda_{max}(R)<0$ and $\theta \in (0,1)$. Letting $$\mu_1 \triangleq \frac{-2\overline{\phi}}{\theta \lambda_{max}(R)} > 0$$

and $\Omega_1 \triangleq \{z(t): \|z(t)\|_2 \leq \mu_1\}$, it follows that $\dot{V}(\cdot) \leq (1-\theta)\lambda_{max}(R)\|z(t)\|_2^2 < 0$ outside the compact set $\Omega_1$, and hence, the error dynamics given by (19) and (20) are uniformly bounded.

Consider also the process given by (7) and the distributed input and state estimation architecture given by (9) and (10). Assume (11) holds the nodes exchange information using local measurements subject to an undirected and connected graph $\mathcal{G}$. Then, for all $z(0) \in \mathbb{R}^{N(n+p)}$, there exists $T = T(z(0), \mu_1) \geq 0$ such that $$\|\tilde{x}(t)\|_2 \leq \xi_1 \triangleq \sqrt{\frac{\lambda_{max}(\overline{P})}{\lambda_{min}(\overline{P})}} \max\left\{ \|z(0)\|_2 e^{\left(\frac{(1-\theta)\lambda_{max}(R)}{2\lambda_{max}(\overline{P})}\right)t}, \mu_1 \right\}, \tag{41}$$

$\forall t \geq 0$, $$\|\overline{w}(t)\|_2 \leq \xi_1, \forall t \geq 0, \tag{42}$$

where $$\overline{P} = \begin{bmatrix} P & 0 \\ 0 & I_{NP} \end{bmatrix}, \tag{43}$$

and

-continued $$\|\tilde{x}(t)\|_2 \leq \psi_1 \triangleq \sqrt{\frac{\lambda_{max}(P)}{\lambda_{min}(P)}} \mu_1, \; t \geq T \quad (44)$$

$$\|\tilde{w}(t)\|_2 \leq \zeta_1 \triangleq \sqrt{\lambda_{max}(P)} \mu_1, \; t \geq T. \quad (45)$$

Note that $$V(\cdot) = \tilde{x}^T(t)P\tilde{x}(t) + \quad (46)$$

$$\tilde{w}^T(t)\tilde{w}(t) = [\tilde{x}^T(t) \; \tilde{w}^T(t)] \begin{bmatrix} P & 0 \\ 0 & I_{NP} \end{bmatrix} \begin{bmatrix} \tilde{x}(t) \\ \tilde{w}(t) \end{bmatrix} = z^T(t)\bar{P}z(t).$$

Let $c_1 \triangleq \lambda_{min}(\bar{P})$, $c_2 \triangleq \lambda_{max}(\bar{P})$ and $c_3 \triangleq -(1-\theta)\lambda_{max}(R)$. From (46) we have $$c_1 \|z(t)\|_2^2 \leq V(\cdot) \leq c_2 \|z(t)\|_2^2. \quad (47)$$

In addition, $\dot{V}(\cdot) \leq -c_3 \|z(t)\|_2^2$. By Theorem 4.5 of [16], since the domain $D = \mathbb{R}^{N(n+p)}$, for every initial state $z(0)$, the bound of the overall system is $$\|z(t)\|_2 \leq \sqrt{\frac{c_2}{c_1}} \max\{\|z(0)\|_2 e^{(-c_3/2c_2)t}, \mu_1\} = \xi, \; \forall \, t \geq 0. \quad (48)$$

Using the fact that $\|\tilde{x}(t)\|_2 \leq \|z(t)\|_2$ and $\|\tilde{w}(t)\|_2 \leq \|z(t)\|_2$, (41) and (42) follow immediate.

As explained above, $V(\cdot)$ cannot grow outside the compact set $\Omega_1$, thus (44) follows from $\lambda_{min}(P)\|\tilde{x}(t)\|_2^2 \leq V(\tilde{x}(t), \tilde{w}(t)) \leq \lambda_{max}(\bar{P})\|z(t)\|_2^2 \leq \lambda_{max}(\bar{P})\mu_1^2$. Identically, (45) follows from $\|\tilde{w}(t)\|_2^2 \leq V(\tilde{x}(t), \tilde{w}(t)) \leq \lambda_{max}(\bar{P})\|z(t)\|_2^2 \leq \lambda_{max}(\bar{P})\mu_1^2$. The proof is now complete.

Since the ultimate bounds given by (44) and (45) depend on the design parameters of the proposed distributed input and state estimation architecture, they can be used as design metrics such that the design parameters can be judiciously selected to make (44) and (45) small. However, unlike the stability of our framework that is guaranteed once each node satisfies the local condition given by (11), such a performance characterization requires global information. However, one can further analyze the effect of each specific design parameter to these ultimate bounds and make conclusions without possibly requiring global information, which will be considered as a future research direction.

Note that the terms "$-\gamma P_i^{-1} \hat{x}_i(t)$" and "$-(\sigma_i K_i + \gamma I_p)\hat{w}_i(t)$" appearing respectively in (9) and (10) are often referred as leakage terms. If the gains "$\gamma P_i^{-1}$" and "$\sigma_i K_i + \gamma I_p$" respectively multiplying these terms are not small, then they may result in poor overall system performance and hence, these multiplier gains are chosen to be small. However, as noted in above, in some implementations, $\sigma_i$ may not be chosen as small unless all nodes are active and the condition $P_i B = C_i^T K_i^T$. Therefore, we cast (11) as an optimization problem given by $$\text{minimize } \sigma_1, \quad (49)$$

$$\text{subject to (11)}, \quad (50)$$

for all nodes $i=1, \ldots, N$.

To elucidate the effect of design parameters to the ultimate bound given by (44), we consider, for example, a system with 4 sensors (1 and 3 are active nodes, and 2 and 4 are passive nodes) tracking a target with dynamics $$\dot{x}(t) = \begin{bmatrix} 0 & 1 \\ -1 & -0.25 \end{bmatrix} x(t) + \begin{bmatrix} 0 \\ 1 \end{bmatrix} w(t), \quad (51)$$

where $w(t) = \sin(0.25t)$. Node 1 is subject to $C_1 = [1\; 0]$, and node 3 is subject to $C_3 = [0\; 1]$. We design $\sigma_i$ by solving the linear matrix inequality (11). As a result, with $K_1 = K_2 = K_3 = K_4 = 50$, we have $\sigma_1 = 0.03$, $\sigma_2 = \sigma_4 = 0.05$, and $\sigma_3 = 0.03$ with $P_1 = \begin{bmatrix} 26.31 & -2.67 \\ -2.67 & 4.01 \end{bmatrix}$, $P_2 = P_4 = \begin{bmatrix} 1.54 & 0.08 \\ 0.08 & 1.62 \end{bmatrix}$, and $P_3 = \begin{bmatrix} 4.60 & 4.02 \\ 4.02 & 25.62 \end{bmatrix}$.

Figure 5:
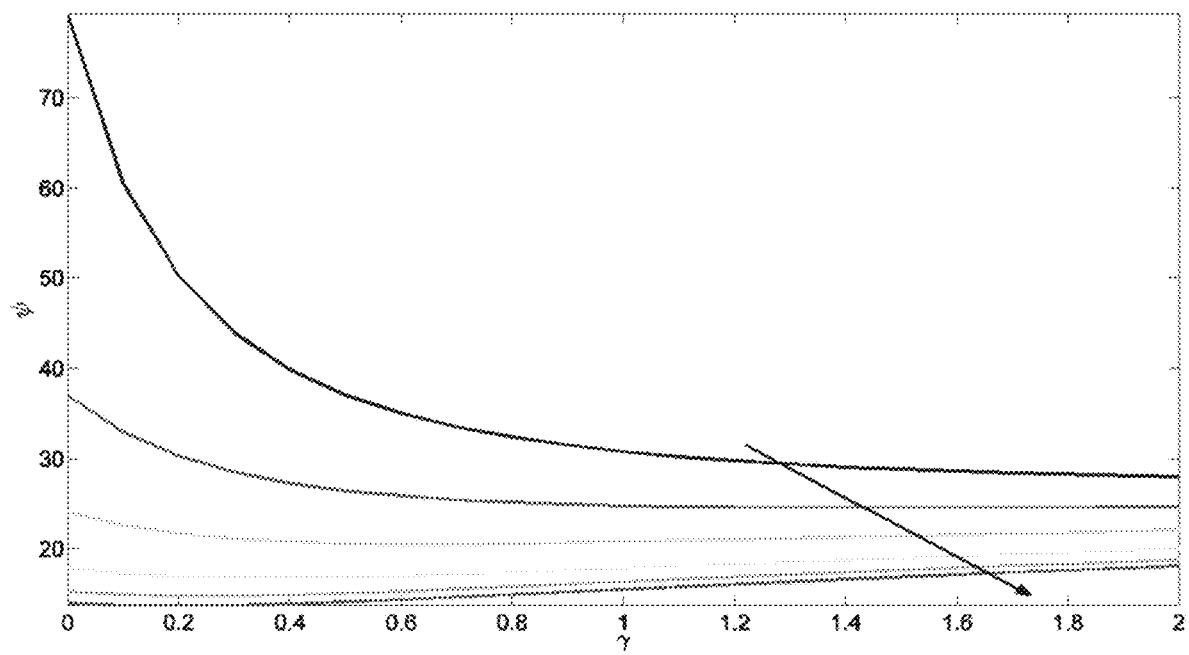
FIG. 5 is a graph illustrating the effect of $\gamma \in (0,2]$ and $\alpha \in \{0.25, 1, 2.5, 5, 10, 50\}$ to an ultimate bound $\psi$ in a mathematical estimation performed by the sensor node of FIG. 1.

We then vary $\alpha$ and $\gamma$ to see the effect of these parameters to the ultimate bound $\psi$ given by (44). FIG. 5 shows the effect of the variation in $\alpha$ and $\gamma$ to (44). From the graph of FIG. 5, we can see that one can pick a small value for $\gamma$ and a large value for $\alpha$ to reduce the ultimate bound.

For the specific numerical examples provided below, consider a process composed of two decoupled systems with the dynamics given by (7), where $$A = \begin{bmatrix} 0 & 1 & 0 & 0 \\ -\omega_{n1}^2 & -2\omega_{n1}\xi_1 & 0 & 0 \\ 0 & 0 & 0 & 1 \\ 0 & 0 & -2\omega_{n2}^2 & -2\omega_{n2}\xi_2 \end{bmatrix}, \quad (52)$$

$$B = \begin{bmatrix} 0 & 0 \\ \omega_{n1}^2 & 0 \\ 0 & 0 \\ 0 & \omega_{n2}^2 \end{bmatrix}, \quad (53)$$

$\omega_{n1} = 1.2$, $\xi_1 = 0.9$, $\omega_{n2} = 0.5$, and $\xi_2 = 0.6$. This process, for example, can represent a linearized vehicle model with the first and third states corresponding to the positions in the x and y directions, respectively, while the second and fourth states corresponding to the velocities in the x and y directions, respectively. The initial conditions are set to $x_0^T = [-3, 0.5, 2.5, 0.25]$. In addition, we consider the input is given by $$w(t) = \begin{bmatrix} 2.5\sin(t) \\ 4\cos(1.2t) \end{bmatrix} \quad (54)$$

For a first example, we consider the sensor network with 12 nodes exchanging information over an undirected and connected graph topology, where there are 4 active nodes and 8 passive nodes as shown in FIG. 2. Each node's sensing capability is represented by (8) with the output matrices $$C_i = \begin{bmatrix} 1 & 0 & 0 & 0 \\ 0 & 0 & 1 & 0 \end{bmatrix}, \quad (55)$$

for the odd index nodes and $$C_i = \begin{bmatrix} 0 & 1 & 0 & 0 \\ 0 & 0 & 0 & 1 \end{bmatrix}, \quad (56)$$

for the even index nodes. In addition, all nodes are subject to zero initial conditions and we set $K_i$=diag([100;100]), $\alpha$=50, and $\gamma$=0.1. For the observer gain $L_i$, the odd index nodes are subject to $$L_i = \begin{bmatrix} 18.969 & -1.907 \\ -0.487 & -0.076 \\ -1.939 & 19.130 \\ -0.285 & 2.492 \end{bmatrix}, \quad (57)$$

while the even index nodes are subject to $$L_i = \begin{bmatrix} -2.388 & 0.358 \\ 5.831 & -0.804 \\ 0.428 & -2.398 \\ -1.038 & 6.765 \end{bmatrix}. \quad (58)$$

By solving the linear matrix inequality (11) for each node, $\sigma_i$ and $P_i>0$ are obtained as $\sigma_1=\sigma_5=0.0021$, $\sigma_2=\sigma_6=1.80\times 10^{-6}$, $\sigma_3=\sigma_4=\sigma_7=\sigma_8=\sigma_9=\sigma_{10}=\sigma_{11}=\sigma_{12}=0.0024$, and $$P_1 = 10^3 \times \begin{bmatrix} 1.440 & -0.034 & 0.055 & -0.005 \\ -0.034 & 0.004 & 0.004 & 0 \\ 0.055 & 0.004 & 0.977 & -0.054 \\ -0.005 & 0 & -0.054 & 0.026 \end{bmatrix}, \quad (59)$$

$$P_2 = 10^2 \times \begin{bmatrix} 0.299 & 0 & 0.036 & 0 \\ 0 & 0.696 & 0 & -0.001 \\ 0.036 & 0 & 0.298 & 0 \\ 0 & -0.001 & 0 & 3.999 \end{bmatrix}, \quad (60)$$

$$P_{12} = \begin{bmatrix} 1.44 & 0 & 0 & 0 \\ 0 & 1 & 0 & 0 \\ 0 & 0 & 1.342 & 0.529 \\ 0 & 0 & 0.529 & 3.496 \end{bmatrix}. \quad (61)$$

Figure 6:
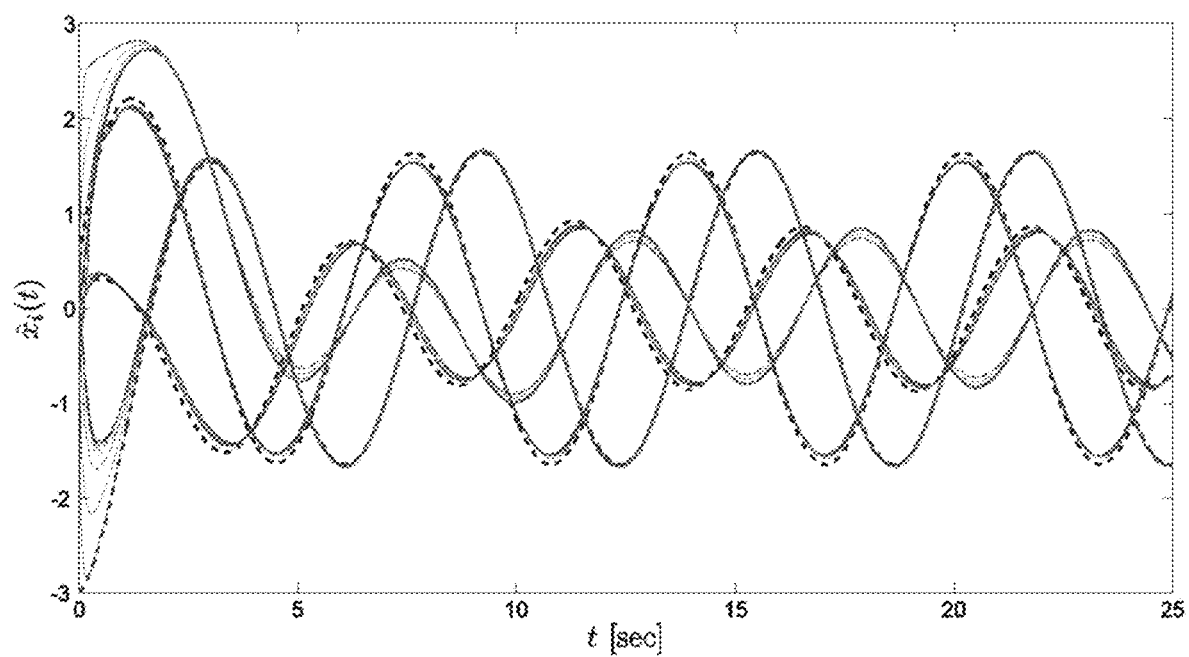
FIG. 6 is a graph illustrating examples of state estimates of the sensor network of FIG. 2 using the method of FIG. 4A.
Figure 7:
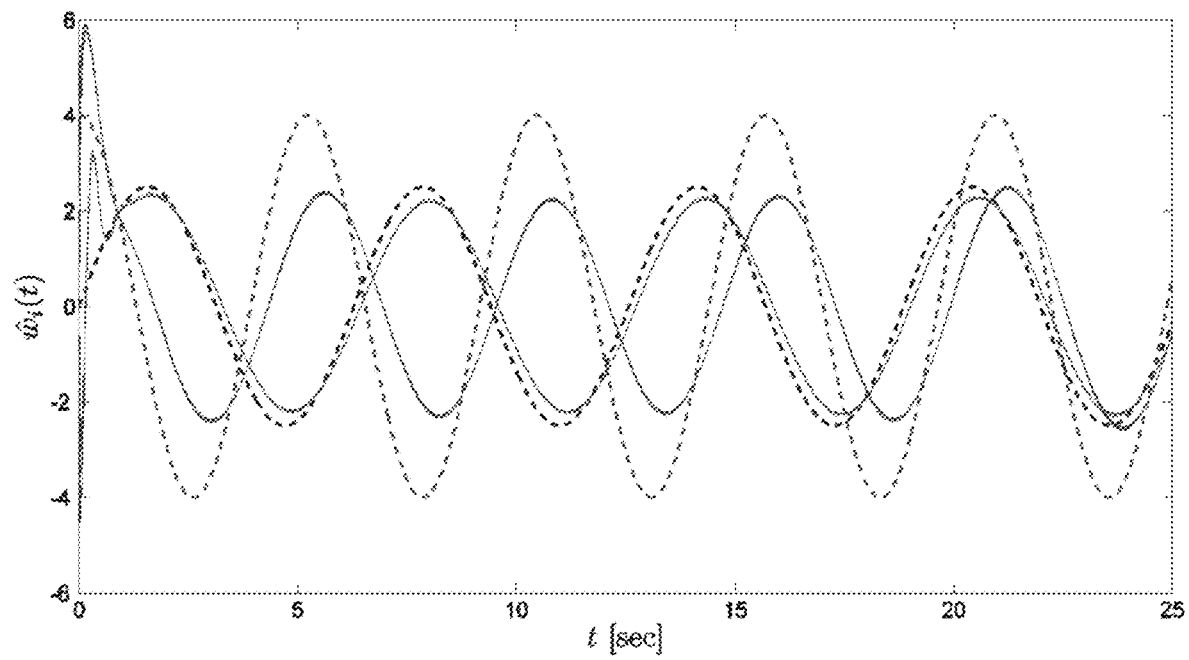
FIG. 7 is a graph illustrating examples input estimates of the sensor network of FIG. 2 using the method of FIG. 4B.

Note that $P_1=P_5$, $P_2=P_6$ and $P_3=P_4=P_7=P_8=P_9=P_{10}=P_{11}=P_{12}$. Under the proposed distributed estimation architecture (9) and (10), nodes are able to closely estimate the process states and inputs as shown in FIGS. 6 and 7, respectively. Note that the dashed lines of FIG. 6 denote the states of the actual process and the solid lines of FIG. 6 denote the state estimates of nodes. Also, the dashed lines of FIG. 7 denote the inputs of the actual process and the solid lines of FIG. 7 denote the input estimates of nodes).

Figure 8:
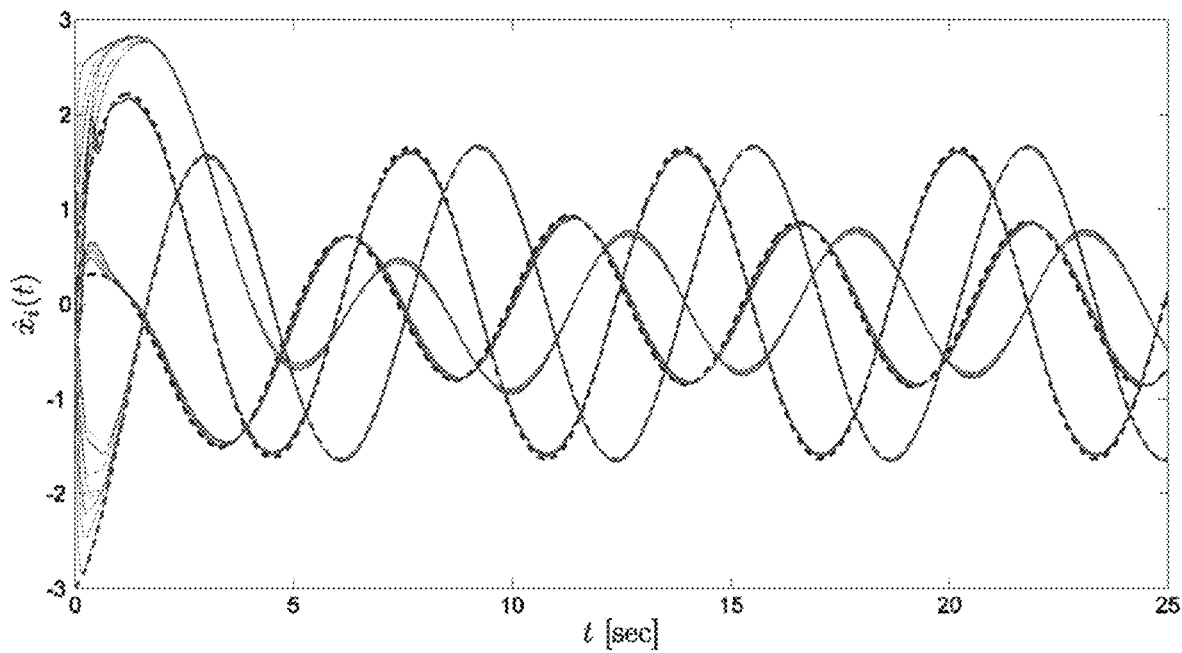
FIG. 8 is a graph illustrating examples of state estimates of the sensor network of FIG. 3 using the method of FIG. 4A.
Figure 9:
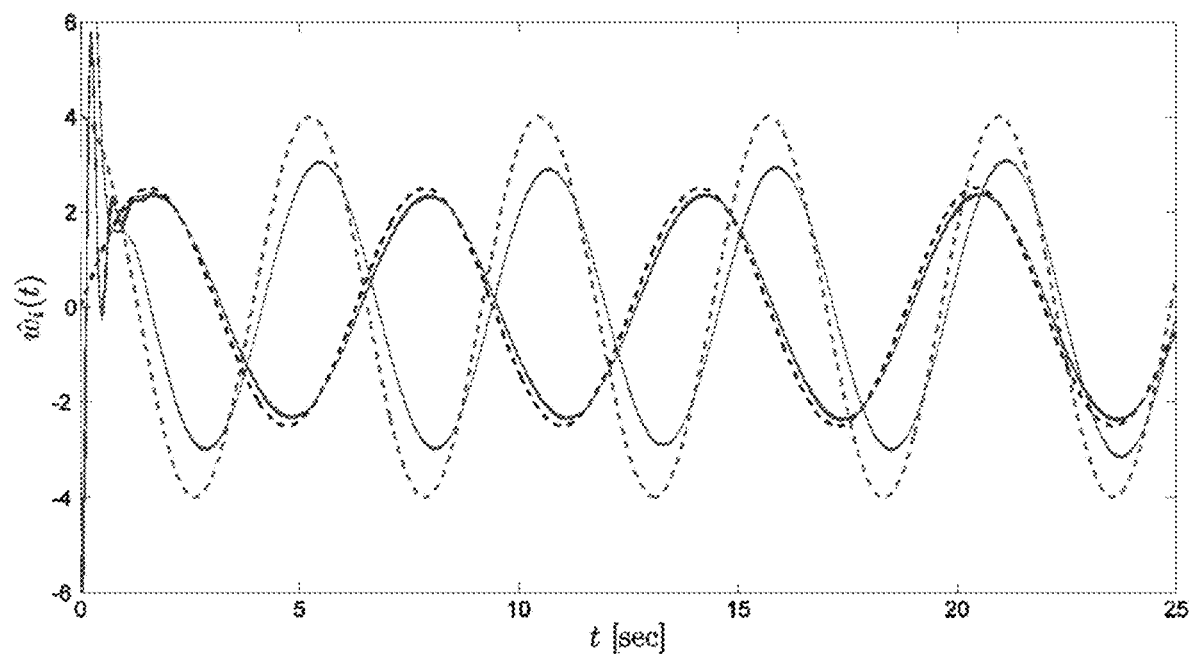
FIG. 9 is a graph illustrating examples of input estimates of the sensor network of FIG. 3 using the method of FIG. 4B.

As a second example, we consider a sensor network with 12 total nodes with eight active nodes and four passive nodes as depicted in the example of FIG. 3. The sensing capability of each agent is the same as in the first example above. Note that, because of the change in the number of active nodes, the design parameters are adjusted accordingly as $\sigma_1=\sigma_3=\sigma_5=\sigma_7=0.0021$, $\sigma_2=\sigma_4=\sigma_6=\sigma_8=1.83\times10^{-6}$, $\sigma_9=\sigma_{10}=\sigma_{11}=\sigma_{12}=0.0024$, and $P_1=P_3=P_5=P_7$, $P_2=P_4=P_6=P_8$, $P_9=P_{10}=P_{11}=P_{12}$, where $P_1$, $P_2$ and $P_{12}$ are the same as (59), (60), and (61), respectively. Other parameters and gains are also kept the same. FIGS. 8 and 9 show the performance of the sensor network for the proposed distributed estimation architecture. Note that the dashed lines of FIG. 8 denote the states of the actual process and the solid lines denote the state estimates of nodes. Similarly, the dashed lines of FIG. 9 denote the inputs of the actual process and the solid lines denote the input estimates of nodes. It can be seen that the estimates in this case are slightly better than the ones in first example (i.e., as illustrated in the graphs of FIGS. 6 and 7) as a result of increasing the number of active nodes in the sensor network.

As a third example, we consider a sensor network that, like the second example, includes 8 active nodes and 4 passive nodes as illustrated in FIG. 3. However, the system output matrices for each node are changed as follows $$C_1 = \begin{bmatrix} 1 & 0 & 0 & 0 \\ 0 & 0 & 0 & 0 \end{bmatrix}, \quad (62)$$

$$C_2 = \begin{bmatrix} 0 & 1 & 0 & 0 \\ 0 & 0 & 0 & 0 \end{bmatrix}, \quad (63)$$

$$C_3 = \begin{bmatrix} 0 & 0 & 0 & 0 \\ 0 & 0 & 1 & 0 \end{bmatrix}, \quad (64)$$

where $C_1=C_5=C_9$, $C_2=C_4=C_6=C_8=C_{10}=C_{12}$ and $C_3=C_7=C_{11}$. Note that for the odd index nodes, the pair (A, $C_i$) is not observable. We also choose $K_i$=diag([100;100]), $\alpha$=50, and $\gamma$=0.1.

Figure 10:
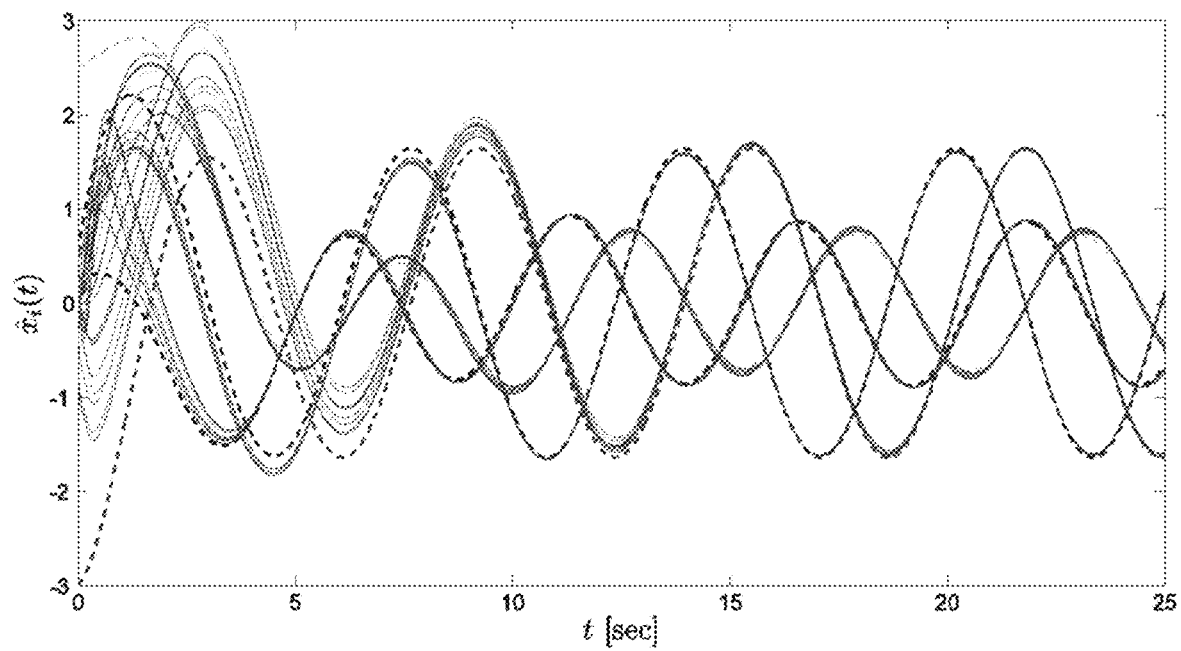
FIG. 10 is a graph illustrating examples of state estimates of a sensor network of FIG. 3 using the method of FIG. 4A with system output matrices that are different than those used in the example of FIG. 8.
Figure 11:
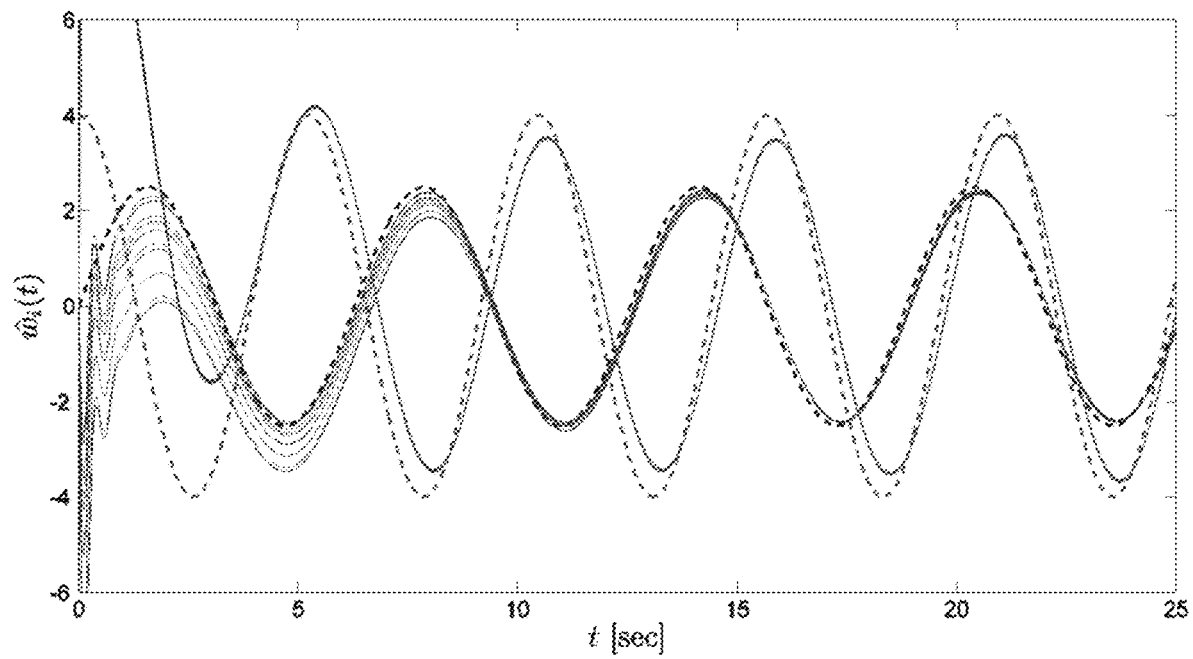
FIG. 11 is a graph illustrating examples of input estimates of the sensor network of FIG. 3 using the method of FIG. 4B with system output matrices that are different than those used in the example of FIG. 9.

Here, the observer gain $L_i$ is chosen such that $$L_1 = \begin{bmatrix} 19.069 & -3.814 \\ -0.486 & 0.097 \\ 0 & 0 \\ 0 & 0 \end{bmatrix}, \quad (65)$$

$$L_2 = \begin{bmatrix} -2.388 & 0.358 \\ 5.831 & -0.804 \\ 0.428 & -2.398 \\ -1.038 & 6.765 \end{bmatrix}, \quad (66)$$

$$L_3 = \begin{bmatrix} 0 & 0 \\ 0 & 0 \\ -3.845 & 19.2250 \\ -0.501 & 2.506 \end{bmatrix}, \quad (67)$$

with $L_1=L_5=L_9$, $L_2=L_4=L_6=L_8=L_{10}=L_{12}$ and $L_3=L_7=L_{11}$. By solving the linear matrix inequality (11) for each node $\sigma_i$ and $P_i>0$ are obtained as $\sigma_1=\sigma_5=0.0024$, $\sigma_2=\sigma_4=\sigma_6=\sigma_8=1.83\times10^{-6}$, $\sigma_3=\sigma_7=0.002$, $\sigma_9=\sigma_{10}=\sigma_{11}=\sigma_{12}=0.0024$, and $$P_1 = \begin{bmatrix} 1.440 & 0 & 0 & 0 \\ 0 & 1.000 & 0 & 0 \\ 0 & 0 & 697.827 & -23.018 \\ 0 & 0 & -23.018 & 18.832 \end{bmatrix}, \quad (68)$$

$$P_3 = 10^3 \times \begin{bmatrix} 1.478 & -0.034 & 0 & 0 \\ -0.034 & 0.004 & 0 & 0 \\ 0 & 0 & 0.002 & 0 \\ 0 & 0 & 0 & 0.006 \end{bmatrix}, \quad (69)$$

with $P_1=P_5$, $P_2=P_4=P_6=P_8$, $P_3=P_7$, and $P_9=P_{10}=P_{11}=P_{12}$, where $P_2$ and $P_{12}$ are the same as (60) and (61) in the first example above, respectively. FIGS. 10 and 11 show that under the proposed distributed estimation architecture, nodes are able to closely estimate the process states and inputs, although some active nodes are not able to fully observe the process. Note that the dashed lines in FIG. 10 denote the states of the actual process and the solid lines denote the state estimates of nodes. Similarly, the dashed lines in FIG. 11 denote the inputs of the actual process and the solid lines denote the input estimates of nodes.

In the three numeric examples presented above, the role of each node as active or passive is fixed. However, as noted above, the methods and systems described herein can be extended to sensor networks where the active and passive role of each sensor node is varying over time. For this purpose, once again, we consider an observed process given by (7). In addition, if a node in the sensor network is active for some time instant, then it is subject to the observations of the process given by (8) on that time instant, otherwise it is a passive node and has no observation. Note that, in the examples below, a node is assumed to be smoothly changed back and forth between active and passive mode.

For the examples described below regarding nodes with a varying status as active and passive, consider the distributed estimation algorithm for node i, i=1, . . . , N, given by $$\dot{\hat{x}}_i(t) = (A - \gamma P_i^{-1})\hat{x}_i(t) + B\hat{w}_i(t) + g_i(t)L_i(y_i(t) - C_i\hat{x}_i(t)) - \alpha P_i^{-1}\Sigma_{i \sim j}(\hat{x}_i(t) - \hat{x}_j(t)), \hat{x}_i(0) = \hat{x}_{i0}, \quad (70)$$

$$\dot{\hat{w}}_i(t) = g_i(t)J_i(y_i(t) - C_i\hat{x}_i(t)) - (\sigma_i K_i + \gamma I_p)\hat{w}_i(t) - \alpha \Sigma_{i \sim j}(\hat{w}_i(t) - \hat{w}_j(t)), \hat{w}_i(0) = \hat{w}_{i0}. \quad (71)$$

where $\hat{x}_i(t) \in \mathbb{R}^n$ is a local state estimate of x(t) for node i, $\hat{w}_i \in \mathbb{R}^p$ is a local input estimate of w(t) for node i, $L_i \in \mathbb{R}^{n \times m}$ and $J_i \in \mathbb{R}^{p \times m}$ are design matrices of node i with $K_i$ being symmetric and positive definite, and $\alpha$, $\gamma$, and $\sigma_i \in \mathbb{R}$ Are positive design coefficients for node i. Note that the parameter $g_i(t)$ in this section is time-varying and $g_i(t) \in [0,1]$. In addition, $P_i > 0$ is the consensus gain satisfying the two linear matrix inequalities given by $$R_{i1} \triangleq \begin{bmatrix} A^T P_i + P_i A & -P_i B \\ -B^T P_i & -2\sigma_i K_i \end{bmatrix} \leq 0, \quad (72)$$

$$R_{i2} \triangleq \begin{bmatrix} (A - L_i C_i)^T P_i + P_i(A - L_i C_i) & -P_i B + C_i^T J_i^T \\ -B^T P_i + J_i C_i & -2\sigma_i K_i \end{bmatrix} \leq 0, \quad (73)$$

i, . . . , N.

For the stability analysis, let $\tilde{x}_i(t) \triangleq x(t) - \hat{x}_i(t)$ and $\tilde{w}_i(t) \triangleq \hat{w}_i(t) - w(t)$. Then, similar to (13) and (14), one can write:

$$\dot{\tilde{x}}_i(t) = \bar{A}_i(t)\tilde{x}_i(t) - B\tilde{w}_i(t) - \alpha P_i^{-1}\sum_{i \sim j}(\tilde{x}_i(t) - \tilde{x}_j(t)) - \gamma P_i^{-1}(\tilde{x}_i(t) - x(t)), \quad (74)$$

$$\tilde{x}_i = \tilde{x}_{i0}$$

$$\dot{\tilde{w}}_i(t) = g_i(t)K_i C_i \tilde{x}_i(t) - \sigma_i K_i(\tilde{w}_i(t) + w(t)) - \alpha \sum_{i \sim j}(\tilde{w}_i(t) - \tilde{w}_j(t)) - \gamma(\tilde{w}_i(t) + w(t)) - \dot{w}(t), \quad (75)$$

$$\tilde{w}_i(0) = \tilde{w}_{i0}$$

where $$\bar{A}_i(t) \triangleq A - g_i(t)L_i C_i. \quad (76)$$

Therefore, as discussed above, the compact form of the error dynamics are given by $$\dot{\tilde{x}}(t) = \bar{A}(t)\tilde{x}(t) - (I_N \otimes B)\tilde{w}(t) - P^{-1}(F \otimes I_n)\tilde{x}(t) + \gamma P^{-1}(I_N \otimes I_n)x(t), \quad (77)$$

$$\dot{\tilde{w}}(t) = M(t)\tilde{x}(t) - \bar{K}(\tilde{w}(t) + (I_N \otimes I_p)w(t)) - (F \otimes I_p)\tilde{w}(t) - \gamma(I_N \otimes I_p)w(t) - (I_N \otimes I_p)\dot{w}(t), \quad (78)$$

where $$\bar{A}(t) \triangleq \text{diag}([\bar{A}_1(t), \bar{A}_2(t), \ldots, \bar{A}_N(t)]), \quad (79)$$

$$M(t) \triangleq \text{diag}([g_1(t)J_1 C_1, g_2(t)K_2 C_2, \ldots, g_N(t)J_N C_N]), \quad (80)$$

and $\bar{K}$, F and P are the same as (23), (24), and (25), respectively.

Consider the process given by (7) and the distributed input and state estimation architecture given by (70) and (71). Assume (72) and (73) hold and nodes exchange information using local measurements subject to an undirected and connected graph G. Then, the error dynamics given by (77) and (78) are uniformly bounded. To further demonstrate this, consider the Lyapunov function candidate given by (26). Following the steps from the proof of Theorem 1, differentiating (26) along the trajectories of (77) and (78) yields $$\dot{V}(\cdot) = z^T(t)R_A(t)z(t) + z^T(t)R_B z(t) + 2z^T(t)\phi, \quad (81)$$

where Z(t), $R_B$ and $\phi$ are defined in (28), (30), and (32), respectively. In addition, $$R_A(t) \triangleq \begin{bmatrix} \bar{A}(t)^T P + P\bar{A}(t) & -P(I_N \otimes B) + M^T(t) \\ -(I_N \otimes B^T) + M(t) & -2\bar{K} \end{bmatrix}. \quad (82)$$

Note that for this varying case of active and passive node roles, $R_i$ in (11) becomes $$R_i(t) = \begin{bmatrix} (A - g_i(t)L_i C_i)^T_i P_i + P_i(A - g_i(t)L_i C_i) & -P_i B + g_i(t)C_i^T K_i^T \\ -B^T P_i + g_i(t)K_i C_i & -2\sigma_i K_i \end{bmatrix} = \quad (83)$$

$$\begin{bmatrix} A^T P_i + P_i A & -P_i B \\ -B^T P_i & -2\sigma_i K_i \end{bmatrix} + g_i(t)\begin{bmatrix} (-L_i C_i)^T P_i + P_i(-L_i C_i) & C_i^T K_i^T \\ K_i C_i & 0 \end{bmatrix}$$

Since $g_i(t) \in [0, 1]$, $R_{i1}$ in (72) and $R_{i2}$ in (73) corresponds to $g_i(t) = 0$ and $g_i(t) = 1$ in (83), respectively. Therefore $R_{i1}$ and $R_{i2}$ are the vertices of the polytope. By Lemma 3, when the linear matrix inequalities (72) and (73) hold, $R_i(t) \leq 0$ for all $g_i(t) \in [0, 1]$. Consequently, using the same argument as discussed above in reference to the examples with nodes having a fixed status as active or passive, we have $R_A(t) \leq 0$. Hence, (81) becomes $$\dot{V}(\cdot) = z^T(t)R_A(t)z(t) + z^T(t)R_B z(t) + 2z^T(t)\phi \leq \lambda_{max}$$
$$(R_B)\|z(t)\|_2^2 + 2\|z(t)\|_2 \bar{\phi} \leq (1-\theta)\lambda_{max}$$
$$(R_B)\|z(t)\|_2^2 + \theta\lambda_{max}(R_B)\|z(t)\|_2^2 + 2\|z(t)\|_2 \bar{\phi}, \quad (84)$$

with $\lambda_{max}(R_B) < 0$ and $\theta \in (0, 1)$. Letting $$\mu_2 \triangleq \frac{-2\bar{\phi}}{\theta\lambda_{max}(R_B)} > 0$$

and $\Omega_2 \triangleq \{z(t):\|z(t)\|_2 \leq \mu_2\}$, it follows that $\dot{V}(\cdot) \leq (1-\theta)\lambda_{max}(R_B)\|z(t)\|_2^2 < 0$ outside the compact set $\Omega_2$, and hence the error dynamics given by (74) and (75) are uniformly bounded.

Consider the process given by (7) and the distributed input and state estimation architecture given by (70) and (71). Assume (72) and (73) hold and nodes exchange information using local measurements subject to an undirected and connected graph $\mathcal{G}$. Then, for all $z(0) \in \mathbb{R}^{N(n+p)}$, there exists $T = T(z(0), \mu_2) \geq 0$ such that $$\|\tilde{x}(t)\|_2 \leq \xi_2 \triangleq \sqrt{\frac{\lambda_{max}(\overline{P})}{\lambda_{min}(\overline{P})}} \max\left\{\|z(0)\|_2 e^{\left(\frac{(1-\theta)\lambda_{max}(R_B)}{2\lambda_{max}(\overline{P})}\right)t}, \mu_2\right\}, \quad (85)$$

$\forall t \geq 0$, $$\|\tilde{w}(t)\|_2 \leq \xi_2, \forall t \geq 0, \quad (86)$$

where $$\overline{P} = \begin{bmatrix} P & 0 \\ 0 & I_{NP} \end{bmatrix}, \quad (87)$$

and $$\|\tilde{x}(t)\|_2 \leq \psi_2 \triangleq \sqrt{\frac{\lambda_{max}(\overline{P})}{\lambda_{min}(\overline{P})}} \mu_2, t \geq T, \quad (88)$$

$$\|\tilde{w}(t)\|_2 \leq \zeta_2 \triangleq \sqrt{\lambda_{max}(\overline{P})} \mu_2, t \geq T. \quad (89)$$

As a numeric example of a sensor network with nodes that varying between active nodes and passive nodes, we consider a process as the vehicle model described in the first, second, and third examples above with the dynamics given by (7), where A and B are defined in (52) and (53), respectively. The initial conditions are set to $x_0^T = [-3, 0.5, 2.5, 0.25]$. In addition, we consider the input is given by $$w(t) = \begin{bmatrix} 2.5\sin(t) \\ 3.5\cos(1.2t) \end{bmatrix}. \quad (90)$$

Figure 12:
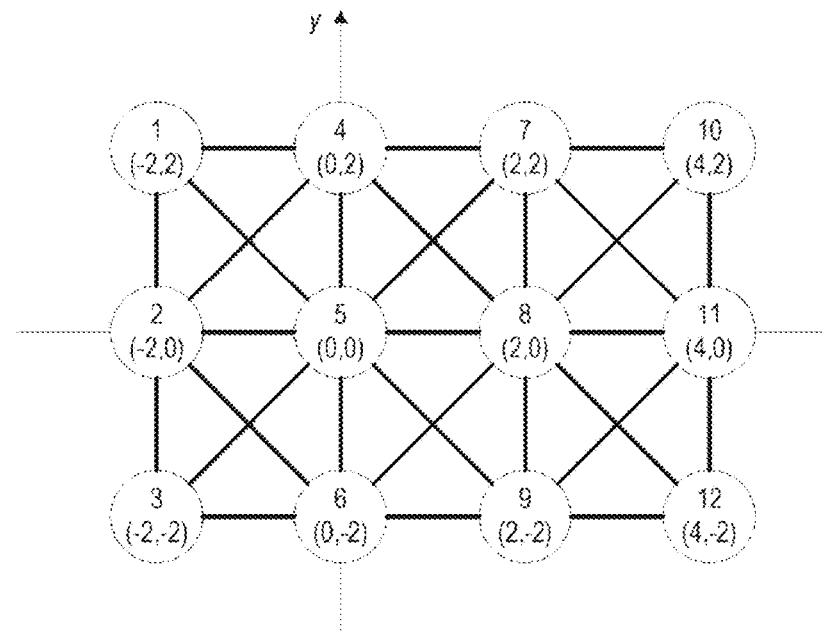
FIG. 12 is a block diagram of another example of a sensor network including twelve sensor nodes where the active and passive role of each node is varying over time.

We now consider an active-passive sensor network with 12 nodes exchanging information over an undirected and connected graph topology as presented in FIG. 12, where the active and passive role of each node is varying overtime. In the example of FIG. 12, the sensors are distributed over an area, and each sensor position is shown in FIG. 12. In this example, each sensor has a sensing range in the shape of a circle with the radius r=3. As described in the examples above, the first and third states of the process (or the vehicle) correspond to the positions in the x-axis and y-axis directions, respectively. If the vehicle's position is within a sensor sensing range, then that sensor becomes smoothly active. On the other hand, if the vehicle's position is out of the sensor sensing range, then it becomes smoothly passive. The network has two types of sensors, and each node's sensing capability is represented by (8) with the output matrices $$C_i = \begin{bmatrix} 1 & 0 & 0 & 0 \\ 0 & 0 & 1 & 0 \end{bmatrix}, \quad (91)$$

for the odd index nodes and $$C_i = \begin{bmatrix} 0 & 1 & 0 & 0 \\ 0 & 0 & 10 & 1 \end{bmatrix}, \quad (92)$$

for the even index nodes. All nodes are subjected to zero initial conditions and we set $K_i = \text{diag}[100; 100]$ $\alpha=50$, and $\gamma=0.1$. For the observer gain $L_i$, the odd index nodes are subject to $$L_i = \begin{bmatrix} 71.7840 & -7.2530 \\ -1.3586 & 0.0005 \\ -7.2565 & 71.8018 \\ -0.0116 & -0.1287 \end{bmatrix}, \quad (93)$$

while the even index nodes are subject to $$L_i = \begin{bmatrix} -21.7248 & 2.2562 \\ 70.0982 & -7.1345 \\ 2.369 & -21.7320 \\ -7.3736 & 71.2935 \end{bmatrix}, \quad (94)$$

By solving the linear matrix inequalities (72) and (73) simultaneously for each node, $\sigma_i$ and $P_i > 0$ ae obtained $\sigma_1 = \sigma_3 = \sigma_5 = \sigma_7 = \sigma_9 = \sigma_{11} = 0.0434$, $\sigma_2 = \sigma_4 = \sigma_6 = \sigma_8 = \sigma_{10} = \sigma_{12} = 0.0275$, and $$P_1 = \begin{bmatrix} 15.366 & 0.288 & 2.891 & -0.519 \\ 0.288 & 8.058 & 0.490 & 1.796 \\ 2.891 & 0.490 & 20.900 & 0.981 \\ -0.519 & 1.796 & 0.981 & 76.693 \end{bmatrix}, \quad (95)$$

$$P_2 = \begin{bmatrix} 110.026 & 2.195 & 0.281 & -1.216 \\ 2.195 & 10.170 & 0.066 & 1.090 \\ 0.281 & 0.066 & 9.473 & 2.834 \\ -1.216 & 1.090 & 2.834 & 25.585 \end{bmatrix}, \quad (96)$$

Note that $P_1 = P_3 = P_5 = P_7 = P_9 = P_{11}$ and $P_2 = P_4 = P_6 = P_8 = P_{10} = P_{12}$.

Figure 13:
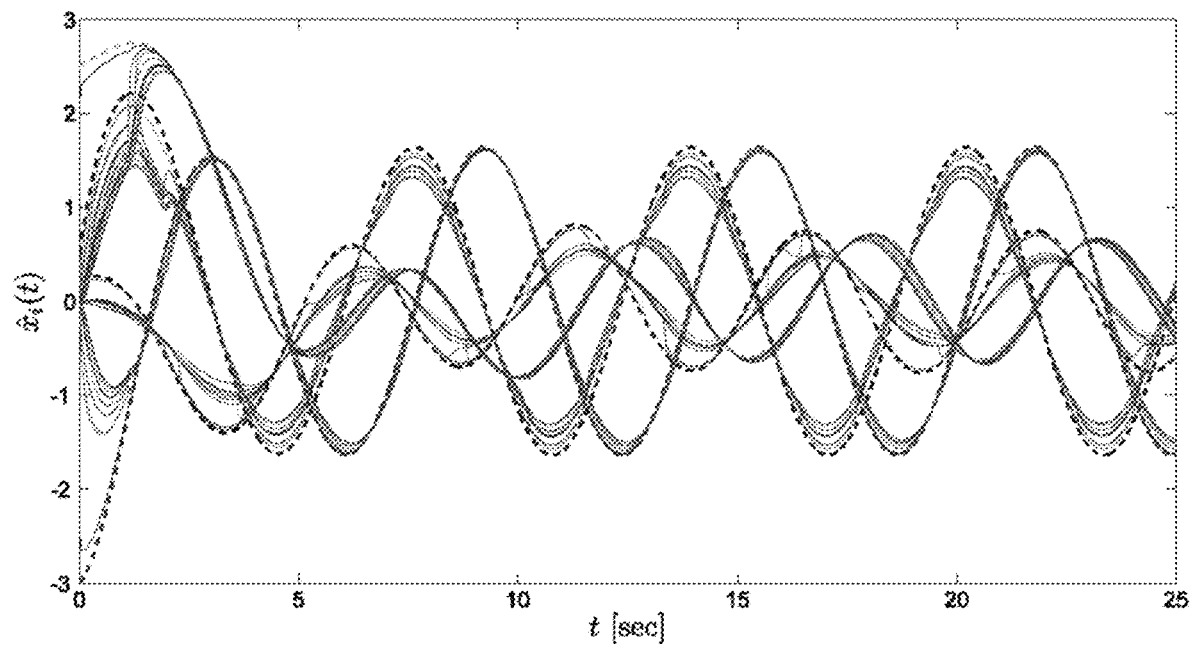
FIG. 13 is a graph illustrating examples of state estimates of the sensor network of FIG. 12 using the method of FIG. 4A.
Figure 14:
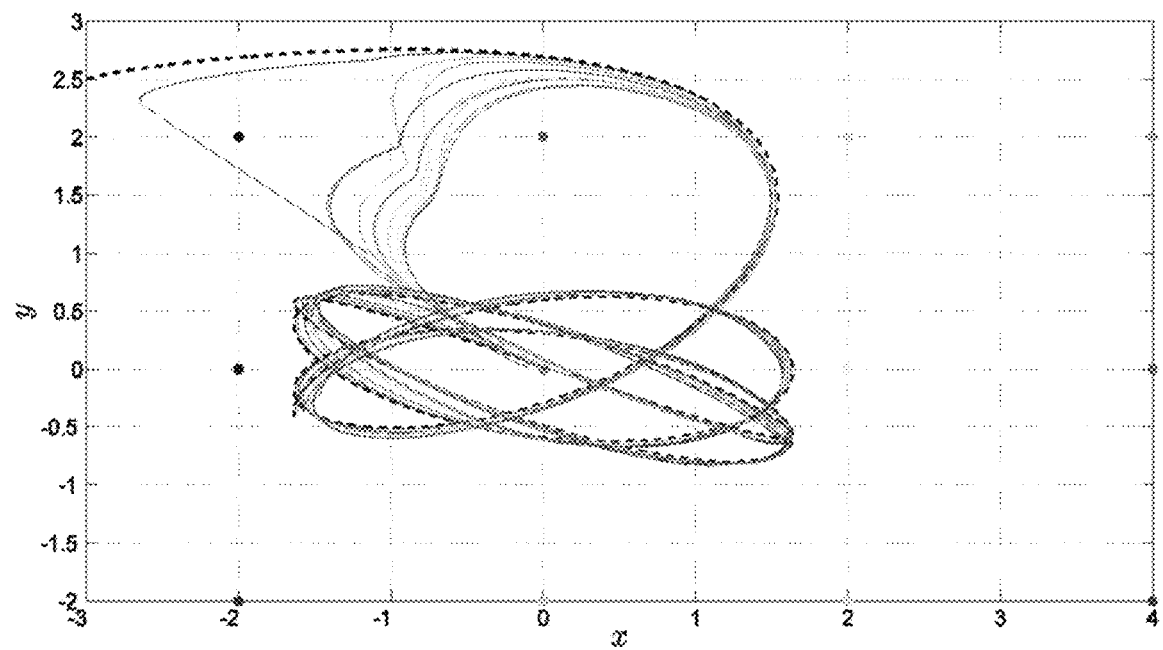
FIG. 14 is a graph illustrating examples of positions of an object estimated by the sensor network of FIG. 12 determined based on the estimated states of FIG. 13.
Figure 15:
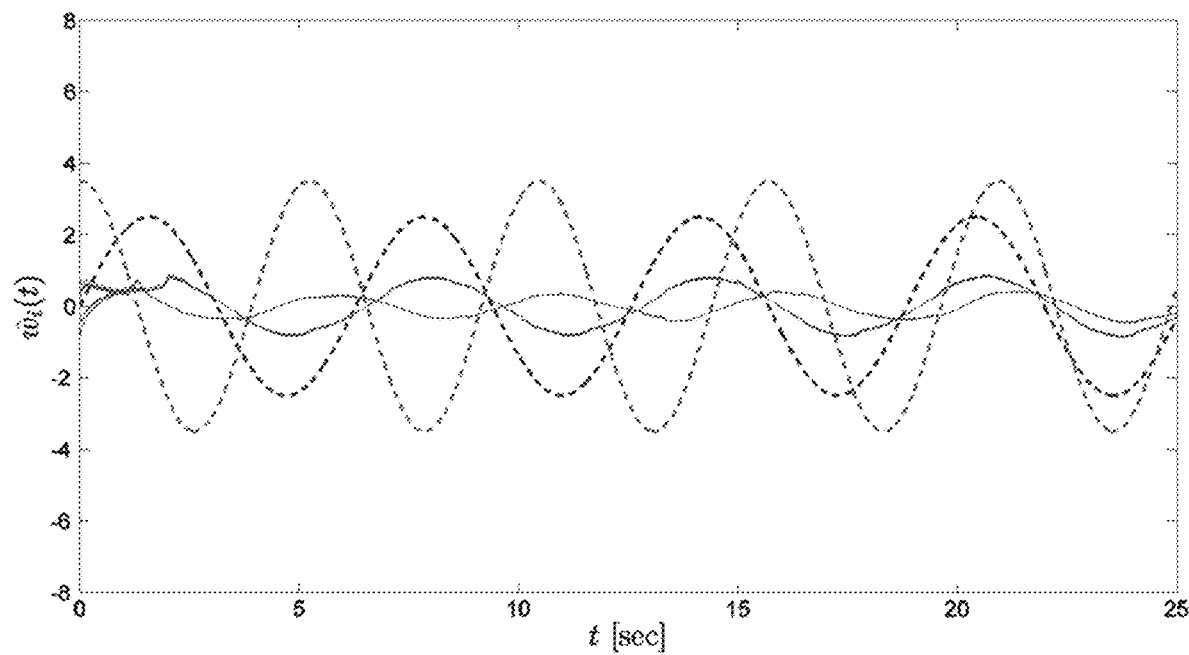
FIG. 15 is a graph illustrating examples of input estimates of the sensor network of FIG. 12 using the method of FIG. 4B.

Under the proposed distributed estimation architecture (70) and (71), nodes are able to closely estimate the process states as shown in FIG. 13. In FIG. 13, the dashed lines denote the states of the actual process and the solid lines denote the state estimates of nodes. FIG. 14 illustrates that the sensor network is able to estimate the trajectory of the vehicle (the first and third state of the process). However, as illustrated in FIG. 15, the system's ability to estimate the process input is not as accurate as the case for fixed node roles described in the other examples above. This can be explained by the conservatism of the solution of the linear matrix inequalities (72) and (73). In FIG. 14, the dashed lines denote the trajectory of the actual process (i.e., the combination of the first and third state) and the solid lines denote the state estimates of nodes). In FIG. 15, the dashed lines denote the inputs of the actual process and the solid lines denote the input estimates of nodes.

Figure 16:
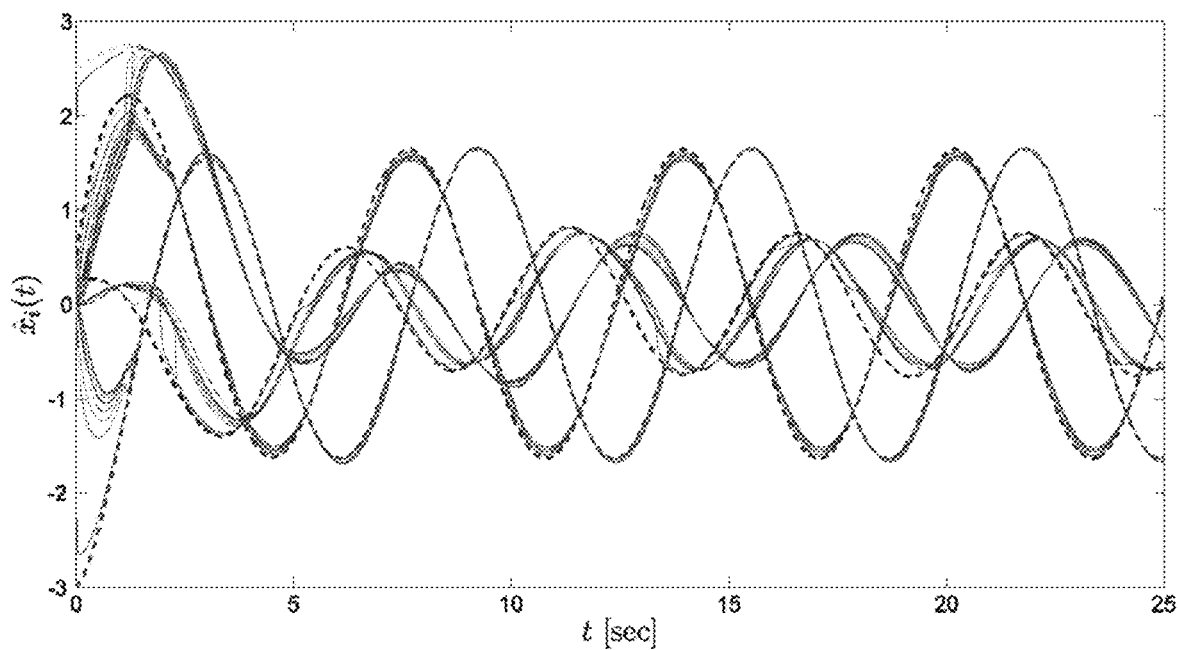
FIG. 16 is a graph illustrating examples of state estimates of the sensor network of FIG. 12 using the method of FIG. 4A after decreasing the value of a positive design coefficient $\sigma_i$.
Figure 17:
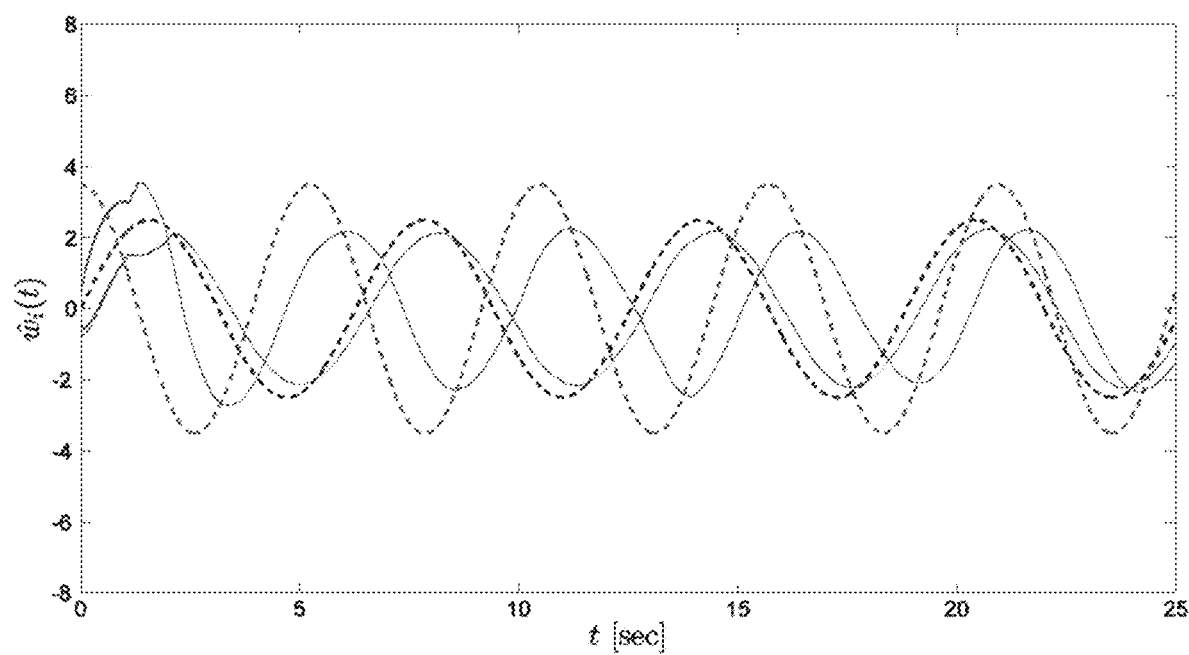
FIG. 17 is a graph illustrating examples of input estimates of the sensor network of FIG. 12 using the method of FIG. 4B after decreasing the value of the positive design coefficient $\sigma_i$.

Furthermore, the accuracy of the input and state estimation can be improved in the sensor network of FIG. 13 by reducing the $\sigma_i$ values such that $\sigma_1 = \sigma_3 = \sigma_5 = \sigma_7 = \sigma_9 = \sigma_{11} = 0.001$, $\sigma_2 = \sigma_4 = \sigma_6 = \sigma_8 = \sigma_{10} = \sigma_{12} = 0.001$, while keeping $P_i$ and other parameters the same, as illustrated in FIGS. 16 and 17, respectively. In FIG. 16, the dashed lines denote the states of the actual process and the solid lines denote the state estimates of nodes. In FIG. 17, the dashed lines denote the inputs of the actual process and the solid lines denote the input estimates of nodes. Numerical methods to reduce such conservatism in linear matrix inequality computations will be investigated for (72) and (73) as a future research.

Thus, the invention provides among other things, systems and methods for estimating a state and an input of an observed process using local sensor node estimation. Various features and advantages of the invention are set forth in the following claims.

What is claimed is:

1. A method for estimating an observed process using a sensor network including a plurality of active sensor nodes and a plurality of passive sensor nodes, the method comprising:
   receiving, by an electronic processor, an output signal from a sensor of a first sensor node indicative of a measurement of the observed process, wherein the first sensor node is varyingly active or passive depending on whether the observed process is occurring within a defined range of the first sensor node;
   calculating, by the electronic processor, a new estimated state of the observed process based at least in part on a previous estimation of the state calculated for the first sensor node and a previous estimation of an input to the observed process calculated for the first sensor node;
   adjusting, by the electronic processor, the new estimated state of the observed process based on an observed difference between a predicted output of the sensor of the first sensor node and an actual output of the sensor of the first sensor node;
   further adjusting, by the electronic processor, the new estimated state of the observed process based on a calculated difference between the previous estimation of the state calculated for the first sensor node and an estimation of the state calculated for a second sensor node, wherein the second sensor node is adjacent to the first sensor node in the sensor network; and
   outputting the adjusted new estimated state of the observed process to at least one adjacent sensor node in the sensor network.

2. The method of claim 1, further comprising determining whether the first sensor node is an active node or a passive node, and
   wherein the act of adjusting the new estimated state of the observed process based on the observed difference between the predicted output of the sensor of the first sensor node and the actual output of the sensor of the first sensor node includes
      adjusting the new estimated state of the observed process based on the observed difference between the predicted output of the sensor of the first sensor node and the actual output of the sensor of the first sensor node only in response to determining that the first sensor node is an active node.

3. The method of claim 1, wherein sensor network includes a plurality of sensor nodes adjacent to the first sensor node that are communicative coupled directly to the first sensor node and a plurality of other sensor nodes that are indirectly coupled to the first sensor node through at least one sensor that is adjacent to the first sensor node.

4. The method of claim 3, wherein further adjusting the new estimated state of the observed process further includes adjusting the new estimated state of the observed process based on calculated differences between the previous estimation of the state calculated for the first sensor node and an estimation of the state for each adjacent sensor node of the plurality of sensor nodes that are communicative coupled directly to the first sensor node.

5. The method of claim 1, further comprising iteratively repeating the steps of receiving the output signal, calculating the new estimated state, adjusting the new estimated state, and further adjusting the new estimated state, wherein the adjusted new estimated state of the observed process that is output to the at least one adjacent sensor node is also used as the previous estimation of the state calculated for the first sensor node in a next subsequent iteration.

6. The method of claim 1, further comprising:
   calculating, by the electronic processor, a new estimated input of the observed process based at least in part on the previous estimation of the input to the observed process;
   adjusting, by the electronic processor, the new estimated input of the observed process based on the observed difference between the predicted output of the sensor of the first sensor node and the actual output of the sensor of the first sensor node;
   further adjusting, by the electronic processor, the new estimated input of the observed process based on a calculated difference between the previous estimation of the input calculated for the first sensor node and an estimation of the input calculated for the second sensor node; and
   outputting the adjusted new estimated input of the observed process to the at least one adjacent sensor node in the sensor network.

7. The method of claim 1, wherein the sensor network is configured to estimate the observed process by estimating movement of an object, wherein calculating a new estimated state of the observed process includes calculating at least one state selected from a group consisting of a location of the object and a velocity of the object, and wherein calculating a new estimated input of the observed process includes calculating an estimated command that controls the movement of the object.

8. The method of claim 1, further comprising:
   receiving, by a second electronic processor of the second sensor node, an output signal from a sensor of the second sensor node indicative of a measurement of the observed process;
   calculating, by the second electronic processor, a new estimated state of the observed process for the second sensor node based at least in part on a previous estimation of the state calculated for the second sensor node and a previous estimation of an input to the observed process calculated for the second sensor node;
   adjusting, by the second electronic processor, the new estimated state of the observed process for the second sensor node based on an observed difference between a predicted output of the sensor of the second sensor node and an actual output of the sensor of the second sensor node;
   further adjusting, by the second electronic processor, the new estimated state of the observed process for the second sensor node based on a calculated difference between the previous estimation of the state calculated for the second sensor node and an estimation of the state calculated for the first sensor node; and
   outputting the adjusted new estimated state of the observed process for the second sensor node to at least one adjacent sensor node in the sensor network.

9. The method of claim 8, wherein the sensor network includes a first subset of sensor nodes configured for a first sensing modality and a second subset of sensor nodes configured for a second sensing modality, wherein receiving, by the electronic processor, the output signal from the sensor of the first sensor node indicative of the measurement of the observed process includes receiving, by the electronic processor, an output signal from the sensor of the first sensor node indicative of a measurement of the observed process in the first sensing modality, and wherein receiving, by the second electronic processor, the output signal from the sensor of the second sensor node indicative of the measurement of the observed process includes receiving, by the second electronic processor, an output signal from the sensor of the second sensor node indicative of a measurement of the observed process in the second sensing modality.

10. The method of claim 8, wherein receiving, by the electronic processor, the output signal from the sensor of the first sensor node indicative of the measurement of the observed process includes receiving, by the electronic processor, an output signal from a position sensor indicative of a position of a moving object, and wherein receiving, by the second electronic processor, the output signal from the sensor of the second sensor node indicative of the measurement of the observed process includes receiving, by the second electronic processor, an output signal from a velocity sensor indicative of a velocity of the moving object.

11. The method of claim 1, further comprising determining whether the first sensor node is an active node or a passive node by determining whether the sensor of the first sensor node is able to sense the observed process.

12. The method of claim 11, wherein the sensor nodes of the plurality of active sensor nodes are each configured to have a fixed status as active sensor nodes, and wherein the sensor nodes of the plurality of passive sensor nodes are each configured to have a fixed status as passive sensor nodes.

13. A sensor network comprising a plurality of sensor nodes arranged in an undirected and connected graph topology, wherein each sensor node in the plurality of sensor nodes is communicatively coupled directly to one or more adjacent sensor nodes and is indirectly coupled to the remaining sensor nodes through the one or more adjacent sensor nodes, wherein the plurality of sensor nodes includes a subset of active sensor nodes that are able to observe a process of interest and a subset of passive sensor nodes that are not able to observe the process of interest, wherein at least one of the sensor nodes is a varying sensor node that is varyingly active or passive depending on whether the observed process of interest is occurring within a defined range of such varying sensor node, wherein each sensor node of the plurality of sensor nodes includes a sensor and an electronic processor configured to iteratively repeat the acts of:

receiving an output signal from the sensor of the same sensor node as the electronic processor, the output signal being indicative of a measurement of the observed process;

calculating a new estimated state of the observed process based at least in part on an estimation of the state calculated by the sensor node in a previous iteration and a previous estimation of an input to the observed process calculated by the sensor node;

adjusting the new estimated state of the observed process based on an observed difference between a predicted output of the sensor of the sensor node and an actual output of the sensor of the sensor node, wherein the predicted output of the sensor is determined based at least in part on the estimation of the state calculated by the sensor node in the previous iteration;

further adjusting the new estimated state of the observed process for the sensor node based on calculated differences between the estimation of the state calculated by the sensor node in the previous iteration and an estimation of the state calculated by each adjacent sensor node; and outputting the adjusted new estimated state of the observed process to each adjacent sensor node.

14. The sensor network of claim 13, wherein the electronic processor of each sensor node of the plurality of sensor nodes in the sensor network is further configured to iteratively repeat the acts of:

calculating a new estimated input of the observed process for the sensor node based at least in part on the previous estimation of the input to the observed process for the sensor node, wherein the previous estimation of the input to the observed process for the sensor node is an estimation of the input to the observed process calculated for the sensor node in the previous iteration;

adjusting the new estimated input of the observed process based on the observed difference between the predicted output of the sensor of the sensor node and the actual output of the sensor of the sensor node;

further adjusting the new estimated input of the observed process based on calculated differences between the previous estimation of the input calculated for the first sensor node and an estimation of the input calculated for each adjacent sensor node; and outputting the adjusted new estimated input of the observed process for the sensor node to each adjacent sensor node.

15. A method for estimating an observed process using a sensor network including a plurality of active sensor nodes and a plurality of passive sensor nodes, the method comprising:

receiving, by an electronic processor, an output signal from a sensor of a first sensor node indicative of a measurement of the observed process, wherein the first sensor node is varyingly active or passive depending on whether the observed process is occurring within a defined range of the first sensor node;

calculating, by an electronic processor, a new estimated input of the observed process based at least in part on a previous estimation of an input to the observed process;

adjusting, by the electronic processor, the new estimated input of the observed process based on an observed difference between a predicted output of the sensor of the first sensor node and an actual output of the sensor of the first sensor node;

further adjusting, by the electronic processor, the new estimated input of the observed process based on a calculated difference between the previous estimation of the input calculated for the first sensor node and an estimation of the input calculated for the second sensor node; and outputting the adjusted new estimated input of the observed process to the at least one adjacent sensor node in the sensor network.

16. The method of claim 15, wherein sensor network includes a plurality of sensor nodes adjacent to the first sensor node that are communicative coupled directly to the first sensor node and a plurality of other sensor nodes that are indirectly coupled to the first sensor node through at least one sensor that is adjacent to the first sensor node.

17. The method of claim 16, wherein further adjusting the new estimated input of the observed process further includes adjusting the new estimated input of the observed process based on calculated differences between the previous estimation of the input calculated for the first sensor node and an estimation of the input for each adjacent sensor node of the plurality of sensor nodes that are communicative coupled directly to the first sensor node.

18. The method of claim 15, further comprising iteratively repeating the steps of receiving the output signal, calculating the new estimated input, adjusting the new estimated input, and further adjusting the new estimated input, wherein the adjusted new estimated input of the observed process that is output to the at least one adjacent sensor node is also used as the previous estimation of the input calculated for the first sensor node in a next subsequent iteration.

19. The method of claim 15, further comprising:
receiving, by a second electronic processor of the second sensor node, an output signal from a sensor of the second sensor node indicative of a measurement of the observed process;
calculating, by the second electronic processor, a new estimated input of the observed process for the second sensor node based at least in part on a previous estimation of an input to the observed process calculated for the second sensor node;
adjusting, by the second electronic processor, the new estimated input of the observed process for the second sensor node based on an observed difference between a predicted output of the sensor of the second sensor node and an actual output of the sensor of the second sensor node;
further adjusting, by the second electronic processor, the new estimated input of the observed process for the second sensor node based on a calculated difference between the previous estimation of the input calculated for the second sensor node and an estimation of the input calculated for the first sensor node; and
outputting the adjusted new estimated input of the observed process for the second sensor node to at least one adjacent sensor node in the sensor network.

20. The method of claim 19, wherein the sensor network includes a first subset of sensor nodes configured for a first sensing modality and a second subset of sensor nodes configured for a second sensing modality,
wherein receiving, by the electronic processor, the output signal from the sensor of the first sensor node indicative of the measurement of the observed process includes receiving, by the electronic processor, an output signal from the sensor of the first sensor node indicative of a measurement of the observed process in the first sensing modality, and
wherein receiving, by the second electronic processor, the output signal from the sensor of the second sensor node indicative of the measurement of the observed process includes receiving, by the second electronic processor, an output signal from the sensor of the second sensor node indicative of a measurement of the observed process in the second sensing modality.

* * * * *